United States Patent
Thatte et al.

(10) Patent No.: US 6,442,620 B1
(45) Date of Patent: Aug. 27, 2002

(54) ENVIRONMENT EXTENSIBILITY AND AUTOMATIC SERVICES FOR COMPONENT APPLICATIONS USING CONTEXTS, POLICIES AND ACTIVATORS

(75) Inventors: Satish R. Thatte, Redmond; Richard D. Hill, Bellevue; Jan S. Gray; Gopal Krishna R. Kakivaya, both of Redmond; Craig H. Wittenberg, Mercer Island; James M. Lyon, Redmond; Rebecca A. Norlander, Seattle; Eric W. Johnson; Scott G. Robinson, both of Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/135,397

(22) Filed: Aug. 17, 1998

(51) Int. Cl.⁷ .................................................. G06F 9/44
(52) U.S. Cl. ....................................... 709/316; 709/318
(58) Field of Search .................. 709/310–322, 709/328–332

(56) References Cited

U.S. PATENT DOCUMENTS

| | | |
|---|---|---|
| 4,635,208 A | 1/1987 | Coleby et al. ............... 716/11 |
| 4,677,576 A | 6/1987 | Berlin, Jr. et al. ........... 345/420 |
| 4,752,928 A | 6/1988 | Chapman et al. ............. 714/39 |
| 4,800,488 A | 1/1989 | Argawal et al. ............ 709/225 |
| 4,821,220 A | 4/1989 | Duisberg ......................... 703/2 |
| 4,953,080 A | 8/1990 | Dysart et al. ............ 707/103 R |

(List continued on next page.)

FOREIGN PATENT DOCUMENTS

| | | | |
|---|---|---|---|
| EP | 0 414 624 A | 2/1991 | ............. G06F/9/46 |
| EP | 0559100 A2 | 2/1993 | ............. G06F/9/46 |
| EP | 0623876 A2 | 3/1994 | ............. G06F/9/46 |
| EP | 0638863 A1 | 10/1994 | ............. G06F/9/46 |
| EP | 0 674 260 A | 9/1995 | ............. G06F/9/46 |
| EP | 0 738 966 A | 10/1996 | ............. G06F/9/44 |
| EP | 0 777 178 A | 6/1997 | ............. G06F/9/44 |
| WO | WO 98-02809 A | 1/1998 | ............. G06F/9/00 |

OTHER PUBLICATIONS

Kiczales, "Going Beyond Objects for Better Separation of Concerns in Design and Implementation," *Aspect–Oriented–Programming*, 1997, 1998.

(List continued on next page.)

*Primary Examiner*—St. John Courtenay, III
(74) *Attorney, Agent, or Firm*—Klarquist Sparkman LLP

(57) ABSTRACT

An object system provides composable object execution environment extensions with an object model that defines a framework with contexts, policies, policy makers and activators that act as object creation-time, reference creation-time and call-time event sinks to provide processing of effects specific to the environment extensions. At object creation time, an object instantiation service of the object system delegates to the activators to establish a context in which the object is created. The context contains context properties that represent particular of the composable environment extensions in which the object is to execute. The context properties also can act as policy makers that contribute policies to an optimized policy set for references that cross context boundaries. The policies in such optimized sets are issued policy events on calls across the context boundary to process effects of switching between the environment extensions of the two contexts.

25 Claims, 19 Drawing Sheets

U.S. PATENT DOCUMENTS

| | | | |
|---|---|---|---|
| 4,972,437 A | 11/1990 | Citron et al. | 375/259 |
| 5,075,848 A | 12/1991 | Lai et al. | 711/152 |
| 5,093,914 A | 3/1992 | Coplien et al. | 717/129 |
| 5,119,475 A | 6/1992 | Smith et al. | 345/866 |
| 5,125,091 A | 6/1992 | Staas, Jr. et al. | 709/101 |
| 5,133,075 A | 7/1992 | Risch | 707/201 |
| 5,151,987 A | 9/1992 | Abraham et al. | 714/20 |
| 5,168,441 A | 12/1992 | Onarheim et al. | 700/17 |
| 5,179,702 A | 1/1993 | Spix et al. | 709/102 |
| 5,181,162 A | 1/1993 | Smith et al. | 707/530 |
| 5,210,874 A | 5/1993 | Karger | 709/328 |
| 5,212,793 A | 5/1993 | Donica et al. | 709/105 |
| 5,307,490 A | 4/1994 | Davidson et al. | 709/328 |
| 5,315,703 A | 5/1994 | Matheny et al. | 345/700 |
| 5,442,791 A | 8/1995 | Wrabetz et al. | 709/330 |
| 5,455,953 A | 10/1995 | Russell | 710/266 |
| 5,459,837 A | 10/1995 | Caccavale | 709/226 |
| 5,485,617 A | 1/1996 | Stutz et al. | 709/315 |
| 5,511,197 A | 4/1996 | Hill et al. | 709/328 |
| 5,517,645 A | 5/1996 | Stutz et al. | 709/316 |
| 5,519,867 A | 5/1996 | Moeller et al. | 709/107 |
| 5,524,238 A | 6/1996 | Miller et al. | 707/4 |
| 5,574,918 A | 11/1996 | Hurley et al. | 712/220 |
| 5,577,251 A | 11/1996 | Hamilton et al. | 709/101 |
| 5,577,252 A | 11/1996 | Nelson et al. | 709/100 |
| 5,579,520 A | 11/1996 | Bennett | 717/151 |
| 5,581,686 A | 12/1996 | Koppolu et al. | 345/784 |
| 5,581,760 A | 12/1996 | Atkinson et al. | 717/108 |
| 5,598,562 A | 1/1997 | Cutler et al. | 709/104 |
| 5,619,710 A | 4/1997 | Travis, Jr. et al. | 709/203 |
| 5,687,370 A | 11/1997 | Garst et al. | 707/206 |
| 5,689,708 A | 11/1997 | Regnier et al. | 709/229 |
| 5,752,038 A | 5/1998 | Blake et al. | 717/158 |
| 5,764,897 A | 6/1998 | Khalidi | 709/201 |
| 5,765,174 A | 6/1998 | Bishop | 707/206 |
| 5,787,251 A | 7/1998 | Hamilton et al. | 709/203 |
| 5,790,789 A | 8/1998 | Suarez | 709/202 |
| 5,794,038 A | 8/1998 | Stutz et al. | 709/315 |
| 5,802,291 A | 9/1998 | Balick et al. | 709/202 |
| 5,838,916 A | 11/1998 | Domenikos et al. | 709/219 |
| 5,864,669 A | 1/1999 | Osterman et al. | 709/328 |
| 5,881,225 A | 3/1999 | Worth | 713/200 |
| 5,884,316 A | 3/1999 | Bernstein et al. | 707/103 R |
| 5,887,171 A * | 3/1999 | Tada et al. | 709/317 |
| 5,889,957 A | 3/1999 | Ratner et al. | 709/227 |
| 5,890,161 A | 3/1999 | Helland et al. | 707/103 R |
| 5,907,675 A | 5/1999 | Aahlad | 709/203 |
| 5,933,593 A | 8/1999 | Arun et al. | 714/6 |
| 5,941,947 A | 8/1999 | Brown et al. | 709/225 |
| 5,958,004 A | 9/1999 | Helland et al. | 709/101 |
| 5,958,010 A | 9/1999 | Agarwal et al. | 709/224 |
| 6,026,428 A | 2/2000 | Hutchison et al. | 709/108 |
| 6,104,147 A | 8/2000 | Molloy | 714/16 |
| 6,014,666 A | 10/2000 | Helland et al. | 707/9 |
| 6,134,594 A | 10/2000 | Helland et al. | 709/229 |
| 6,301,601 B1 * | 10/2001 | Helland et al. | 709/101 |

OTHER PUBLICATIONS

Lopes et al., "Proceedings of the Aspect–Oriented Programming Workshop at ECOOP '98," 1998.

Lopes et al., "Proceedings of the Apect–Oriented Programming Workshop at ECOOP '97," 1997.

"Using Secure RPC," MSDN Library CD, pp. 1–7, Apr. 1998.

Brown et al., "Distributed Component Object Model Protocol—DCOM/1.0," http://globecom.net/ietf/draft/draft–brown–dcom–v1–spec–03.html, pp. 1–52, Jan. 1998.

U.S. application Ser. No. 09/071,594, Fox et al., filed May 1, 1998.

"Implementing locale as dynamically loaded shared object files," *IBM Technical Disclosure Bulletin*, US, IBM Corporation, New York, vol. 34, No. 12, pp. 117–118 (1992).

Jonathan D. Moffett. Specification of Management Policies and Discretionary Access Control. In M. S. Sloman, editor, Network and Distributed Systems Management, chapter 18, pp. 18–1 through 18–21. Addison–Wesley, 1994.

Sloman, M., and J. Moffett. "Managing Distributed Systems", Domino Project Report , Imperial College, U.K. Sep. 1989 (pp. 1–23).

G. Wiederhold: Mediators in the Architecture of Future Information Systems. IEEE Computer, 25(3), 1992 (36 pages).

M. S. Sloman, Policy Driven Management for Distributed Systems. Journal of Network and Systems Management, 2(4): 333–360, Plenum Press Publishing, 1994 (22 pages in downloaded format).

Jonathan D. Moffett, Morris S. Sloman. Policy Hierarchies for Distributed Systems Management. IEEE Journal on Selected Areas in Communications, Special Issue on Network Management, 11(9):1404–1414, Dec. 1993 (22 pages in downloaded format).

Scott A. Gile. Reporting Application Usage in a LAN Environment, New Centerings in Computing Services, pp. 147–159 (1990).

Moffett J.D. & Sloman, M.S. (1991b), The Representation of Policies as System Objects, Proceedings of the Conference on Organisational Computer Systems (COCS'91) Atlanta, GA, Nov. 5–8, 1991, in SIGOIS Bulletin vol. 12, Nos. 2 & 3, pp 171–184 (16 pages in downloaded format).

Brockschmidt, "Chapter 6 Local/Remote Transparency," Inside Ole, 2d Ed., pp. 277–338 (1995).

Lam, "Building Scalable Apps," PC Tech Magazine, pp. 209–214 (Apr. 1998).

Microsoft, Windows NT® Server, Server Operating System White Paper, "DCOM Technical Overview," pp. 43 (Apr. 1998).

Orfali et al., ["COM:OLE's Object Bus"], The Essential Distributed Objects Survival Guide, Ch. 25, pp. 429–452 (© 1996).

Orfali et al., "CORBA Services: System Management and Security," The Essential Distributed Objects Survival Guide, Ch. 10, pp. 183–202 (1996).

Tomsen, "Virtually Crash–Proof your Web site with IIS 4.0," Microsoft Interactive Developer, 2:10, pp. 41–46 (Oct. 1997).

Orfali et al., Ch. 9, "RPC, Messaging, and Peer–to–Peer," Essential Client/Server Survival Guide, John Wiley & Sons, Inc., pp. 119–128 (1994).

"Chapter 9: Connectable Objects," Footnotes, pp. 1–12, http://www.microsoft.com/oledev/olecom/Ch09.htm.

Hackathorn, "Solutions to overworked networks and unruly software distribution are just part of P&S," BYTE Magazine, pp. 1–15 (Sep. 1997).

Hamilton (Ed.), "JavaBeans™," Sun Microsystems, Version 1.01, pp. 1–114. (Jul. 1997).

Horstmann et al., "DCOM Architecture," DCOM Architecture, Microsoft Press, pp. 1–55 (Apr. 1998).

Hurwicz, "Multicast to the Masses: The IP multicast standard is ready, but the infrastructure isn't. Yet . . . " BYTE Magazine, pp. 1–10 (Jun. 1997).

Hackathorn, "When information links change constantly, Publish and Subscribe promises robust data deliver" BYTE Magazine, pp. 1–8 (Jun. 1997).

Loshin, "Pull out the old and push in the new with reliable and scalable P&S middleware," BYTE Magazine, pp. 1–11 (Feb. 1998).

Managing Performance/Reliability Trade–Offs, BYTE Magazine, Review, pp. 1–2 (Feb. 1998).

"Monkey in the Middleware," BYTE Magazine, Reviews, pp. 1–2 (Feb. 1998).

Montgomery, "Distributing Components: For CORBA and DCOM it's time to get practical," BYTE Magazine, Special Report, pp. 1–10 and illustrations "DCOM Architecture" and "CORBA Architecture" (Apr. 1997).

Skeen, "Enabling the Real–Time Enterprise," BYTE Magazine, Core Technologies, pp. 1–5 and illustrations "Reliable Multicast Protocol in Action" and "Multilevel Caching Over a WAN" (Jan. 1998).

Matena et al., "Enterprise JavaBeans™," Version 1.0 Specification, Sun Microsystems, pp. 1–181 (Mar. 21, 1998).

"The Component Object Model: Technical Overview," Microsoft Corporation, pp. 1–17.

Seetharaman, "The CORBA Connection," Communications of the ACM, 41:10, pp. 34–36 (Oct. 1998).

Siegel, "OMG Overview: CORBA and the OMA in Enterprise Computing," Communications of the ACM, 41:10, pp. 37–43 (Oct. 1998).

Vinoski, "New features for CORBA 3.0," Communications of the ACM, 41:10, pp. 44–52 (Oct. 1998).

Schmidt, "Evaluating Architectures for Multithreaded Object Request Brokers," Communications of the ACM, 41:10, pp. 54–60 (Oct. 1998).

Henning, "Binding, Migration, and Scalability in CORBA," Communications of the ACM, 41:10, pp. 62–71 (Oct. 1998).

Haggerty et al., "The Benefits of CORBA–Based Network Management," Communications of the ACM, 41:10, pp. 73–79 (Oct. 1998).

Grimes, Chapter 7: Security, DCOM Programming: A guide to creating practical applications with Microsoft's Distributed Component Object Model, pp. 319–389 (1997).

Schwartz et al., "Intel's middleware move: company ponders initiatives for common object services," Info World 20:9, p. 1–2., (Mar. 2, 1998).

Sessions, COM and DCOM:Microsoft's Vision for Distributed Objects, Chapter 6, Sharing and Scalability, pp. 249–313.

Sessions, COM and DCOM: Microsoft's Vision for Distributed Objects, Chapter 10, "Clustering," pp. 413–442, 1998.

"Remote Method Invocation Specification," http://java.sun.com/products/jdk/1.1/docs/guide/rmi/spec/rmiTOC.doc.html, pp. 1–2 1997.

"Introduction," http://java.sun.com/products/jdk/1.1/docs/guide/rmi/spec/rmi–intro.doc.html, pp. 1–2, 1997.

"Java Distributed Object Model," http://java.sun.com/products/jdk/1.1/docs/guide/rmi/spec/rmi–objmodel.doc.html, pp. 1–7, 1997.

"System Architecture," http://java.sun.com/products/jdk/1.1/docs/guide/rmi/spec/rmi–arch.doc.html, pp. 1–12, 1997.

"Client Interfaces," http://java.sun.com/products/jdk/1.1/docs/guide/rmi/spec/rmi–client.doc.html, pp. 1–3, 1997.

"Server Interfaces," http://java.sun.com/products/jdk/1.1/docs/guide/rmi/spec/rmi–server.doc.html, pp. 1–10, 1997.

"Registry Interfaces," http://java.sun.com/products/jdk/1.1/docs/guide/rmi/spec/rmi–registry.doc.html, pp. 1–3, 1997.

"Stub/Skeleton Interfaces," http://java.sun.com/products/jdk/1.1/docs/guide/rmi/spec/rmi–stubs.doc.html, pp. 1–4, 1997.

"Garbage Collector Interfaces," http://java.sun.com/products/jdk/1.1/docs/guide/rmi/spec/rmi–dgc.doc.html, pp. 1–5, 1997.

"RMI Wire Protocol," http://java.sun.com/products/jdk/1.1/docs/guide/rmi/spec/rmi–protocol.doc.html, pp. 1–9, 1997.

"Exceptions in RMI," http://java.sun.com/products/jdk/1.1/docs/guide/rmi/spec/rmi–exceptions.doc.html, pp. 1–3, 1997.

"Properties in RMI," http://java.sun.com/products/jdk/1.1/docs/guide/rmi/spec/rmi–properties.doc.html, p. 1, 1997.

Barkley, "Role Based Access Control (RBAC)," Software Diagnostics and Conformance Testing, National Institute of Standards and Technology, pp. 1–27, Mar. 1998.

Gavrila and Barkley, "Formal Specification for Role Based Access Control User/Role and Role/Role Relationship Management," pp. 1–10, Oct. 1998.

Cugini and Ferraiolo, "Role Based Access Control Slide Set—May 1995," National Institute of Standards and Technology, pp. 1–25, May 1995.

Ferraiolo and Barkley, "Specifying and Managing Role–Based Access Control within a Corporate Intranet," pp. 1–6, 1997.

Ferraiolo and Kuhn, "Role–Based Access Control," Reprinted from *Proceedings of 15th National Computer Security Conference*, pp. 1–11, 1992.

Jajodia, "Database Security and Privacy," *The Computer Science and Engineering Handbook*, Tucker (ed.), CRC Press, Inc., pp. 1112–1124, Dec. 1996.

Orfali, Harkey, Edwards, "Client/Server Transaction Processing," *Essential Client/Server Survival Guide*, pp. 241–288, 1994.

Adams et al., *C++ An Introduction to Computing*, pp. 860–869, 1995.

Brockschmidt, "Custom Components and the Component Object Model," *Inside OLE*, $2^{nd}$ Edition, pp. 219–276, 1995.

Brockschmidt, "In–Place Activation (Visual Editing™) and In–Place Containers," *Inside OLE*, $2^{nd}$ Edition, pp. 1011–1063, 1995.

Sandhu, "Authentication, Access Control, and Intrusion Detection," *The Computer Science and Engineering Handbook*, Tucker (ed.), CRC Press, Inc., pp. 1929–1948, Dec. 1996.

"CORBA Overview," *The Common Object Request Broker: Architecture and Specification*, Version 2.0, pp. 2–1 through 2–17, Jul. 1995.

*The Common Object Request Broker: Architecture and Specification*, Version 2.0, pp. 4–12 through 4–16, Jul. 1995.

Thacker et al., *Firefly: A Multiprocessor Workstation*, Digital, pp. 1–18, Dec. 30, 1987.

Schroeder et al., *Performance of Firefly RPC*, Digital Equipment Corporation, pp. 1–15, Apr. 15, 1989.

"Balance on the Back End," *InfoWorld*, pp. 72–75, 78, 80, 82–83, and 86, Mar. 23, 1998.

Baker, "Network Management in the Enterprise," *Performance Computing*, vol. 17, No. 6, pp. 23–24, 26, 28–30, and 32–34, Jun. 1999.

Bower, "Intel's Middleware Move," *InfoWorld*, vol. 20, No. 9, pp. 1–2, 1998.

Davis, "Inside IBM's System View," *Datamation*, vol. 37, No. 4, pp. 62–65, Feb. 15, 1991.

Landwehr, "Protection (Security) Models and Policy," *The Computer Science and Engineering Handbook,* Tucker (ed.), CRC Press, Inc. pp. 1914–1928, Dec. 1996.

Nance, "Balance the Load with Transaction Server," *BYTE Magazine,* http://www.byte.com/art/9706/sec6/art1.htm, pp. 1–8, Sep. 1, 1998.

Bochenski, *IBM's SystemView,* Computer Technology Research Corporation, 1st Edition, pp. 1–143, Jul. 1991.

Brockschmidt, "An Overview of OLE," *Inside OLE, 2nd* Edition, pp. 3–60, 1995.

Brockschmidt, *Inside OLE, 2nd* Edition, pp. 248–251, 1995.

Cornell et al., "Objects and Classes," Core Java, Sun Microsystems, Inc., pp. 93–139, 1997.

Deitel et al., "Classes and Data Abstraction," *C++ How to Program,* Prentice Hall, pp. 344–356, 1994.

Horstmann et al., *DCOM Architecture,* pp. 1–51, Jul. 23, 1997.

"Java Remote Method Invocation—Distributed Computing for Java," http://java.sun.com/marketing/collateral/javarmi.html, pp. 1–19, Jun. 24, 1998.

"Java Remote Method Invocation," http://java.sun.com/products/jdk/1.2/docs/guide/rmi/spec/rmiTOC.doc.html, 154 pp. Dec. 1997.

U.S. application Ser. No. 08/959,139, Limprecht et al., filed Oct. 28, 1997.

U.S. application Ser. No. 08/959,149, Helland et al., filed Oct. 28, 1997.

"Active Objects in Hybrid," *Proceedings of OOPSLA* 1987, by O.M. Nierstrasz, pp. 243–253, Oct. 4–8 (1987).

"Implementing Locale As Dynamically Loaded Shared Object Files", *IBM Technical Disclosure Bulletin,* US, IBM Corp., New York, vol. 34, No. 12, pps. 117–118 (1992).

R. Limprecht, "Microsoft Transaction Server", *IEEE,* pp. 14–18 (Feb. 1997).

G. Eddon, "COM+: The Evolution of Component Services", *IEEE on Computer,* pp. 104–106 (Jul. 1999).

Object Transaction Services, OMG document 94.6.1 (Jun. 1994).

(No author given) "Transaction Context Objects in Microsoft Transaction Server", MSDN, pp (2) (Jun. 1997).

D. Chappell, "The Microsoft Transaction Server (MTS)—Transactions Meet Components", white paper, Microsoft.com (Jun. 1997).

"Implementing Locale As Dynamically Loaded Shared Object Files", IBM Technical Disclosure Bulletin, US, IBM Corp., New York, vol. 34, No. 12, pps. 117–118 XP000308454 ISSN: 0018-8689—the whole document.

Tripathi, A.R. et al.: Design Of A Remote Procedure Call System For Object–Oriented Distributed Programming, Software Practice & Experience, GB, John Wiley & Sons Ltd., Chichester, vol. 28, No. 1, pp. 23–47 XP000723715, ISSN: 0038-0644—the whole document.

Tucker (editor, "The Computer Science and Engineering Handbook," chapter 49, pp. 1112–1124 and chapter 91, pp. 1929–1948 (Dec. 1996).

* cited by examiner

FIG. 5

```
interface IContext : IUnknown {
        HRESULT SetProperty(REFGUID guid, IUnknown* punk);
        HRESULT GetProperty(REFGUID guid, OUT IUnknown** ppv);
        HRESULT EnumContextProperties(OUT IEnumContextProperties** ppv);
};

interface IObjectContext : IContext {
        HRESULT Freeze();
};
```

170

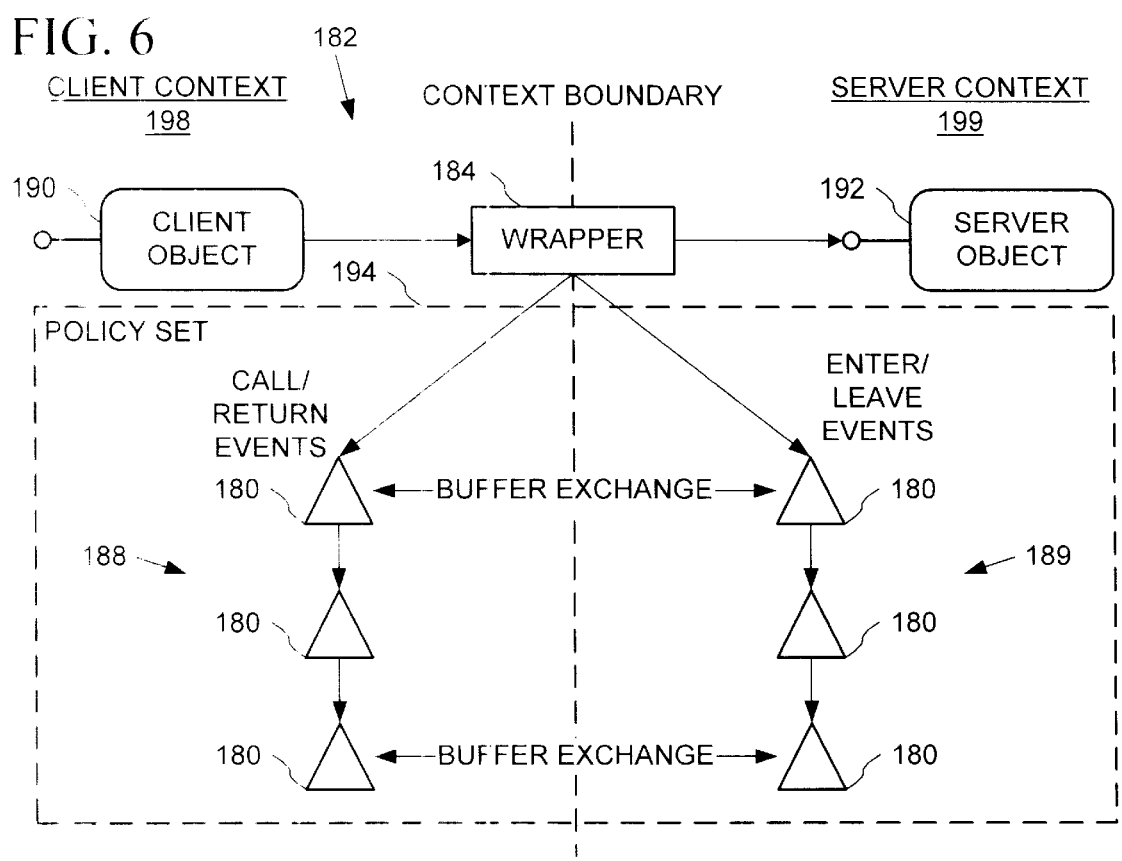

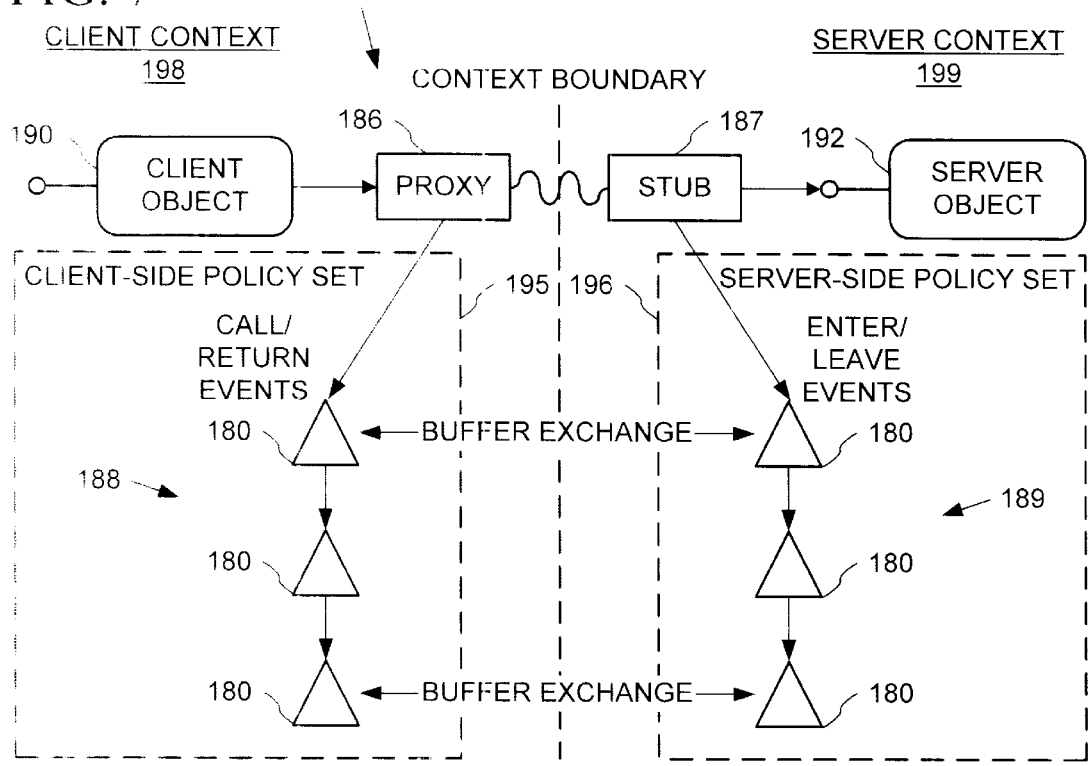

FIG. 8

```
typedef ULONG ContextEvent;
const ContextEvent
        ceCall = 1, ceReturn = 2, ceEnter = 4, ceLeave = 8,
        ceCallGetSize = 0x100, ceCallFillBuffer = 0x200,
        ceEnterWithBuffer = 0x400, ceLeaveGetSize = 0x1000,
        ceLeaveFillBuffer = 0x2000, ceReturnWithBuffer = 0x4000,
        ceReleasePolicy = 0x10000, ceAddRefPolicy = 0x20000;
interface IPolicy : IUnknown {
        // New events
        HRESULT Signal(ULONG ceType, IRpcCall *pcall);

// Call events
        HRESULT Call(IRpcCall* pcall);
        HRESULT Enter(IRpcCall* pcall);
        HRESULT Leave(IRpcCall* pcall);
        HRESULT Return(IRpcCall* pcall);

// Call events which pass a buffer
        HRESULT CallGetSize(IRpcCall* pcall, ULONG* pcb);
        HRESULT CallFillBuffer(IRpcCall* pcall, ULONG* pcb, void* pvBuf);
        HRESULT EnterWithBuffer(IRpcCall* pcall, ULONG cb, void* pvBuf);
        HRESULT LeaveGetSize(IRpcCall* pcall, OUT ULONG* pcb);
        HRESULT LeaveFillBuffer(IRpcCall* pcall, ULONG* pcb, void* pvBuf);
        HRESULT ReturnWithBuffer(IRpcCall* pcall, ULONG cb, void* pvBuf);

// Policy added or released
        HRESULT ReleasePolicy(IRpcCall* pcall);
        HRESULT AddRefPolicy(IRpcCall* pcall);
};

interface IRpcCall : IUnknown {
        HRESULT GetParameter(void **);
        HRESULT nullify(HRESULT);
}
```

FIG. 10

```
interface IPolicySet : IUnknown {
        // TODO: mechanism to achieve a particular policy order
        HRESULT AddPolicy(IN ContextEvent rgfCE,
            IN GUID guidPolicy,
            IN IPolicy* ppolicy);
        HRESULT Freeze();
};
```
208

FIG. 11

```
// Context marshaling flags
typedef ULONG ContextMarshalType;
const ContextMarshalType
        cmServerSameApt = 1, cmClientSameApt = 2,
        cmServerSameProcess = 3, cmClientSameProcess = 4;
        cmServerOtherProcess = 5, cmClientOtherProcess = 6;
interface IPolicyMaker : IUnknown {
        HRESULT AddPolicies(IN IPolicySet* pset,
            IN ContextMarshalType cm,
            IN IContext* pctxtDest); }
```
210

FIG. 16

245
```
Interface IWrapper: public IUnknown
{
HRESULT LookupChannel([in] IUnknown *pUnk,
                     [out] ICtxChannel *pCtxChannel);
}
```

FIG. 17

249
```
Interface ICtxChannel: public IUnknown
{
HRESULT Register();
HRESULT Invoke(RPCOLEMESSAGE *pMessage);
}
```

FIG. 20

370 — WINOLEAPI CoGetObjectContext([in] REFIID riid, [out,iid_is(riid)] void **ppCtx)

```
interface IActivator : IUnknown
{   HRESULT CreateInstance( [in] REFCLSID rclsid,
                    [in] IUnknown* pUnk,
                    [in] REFIID riid,
                    [out,iid_is(riid)]
                        void **ppv );
    HRESULT GetClassObject( [in] REFCLSID rclsid,
                    [in] REFIID riid,
                    [out,iid_is(riid)]
                        void **ppv ); } interface ISystemActivator : IUnknown
{   HRESULT GetClassObject([in,unique]IActivationPropertiesIn *pActProperties,
          [out] IActivationPropertiesOut **ppActProperties);
    HRESULT CreateInstance([in,unique] IUnknown *pUnkOuter,
        [in,unique] IActivationPropertiesIn *pActProperties,
        [out] IActivationPropertiesOut **ppActProperties);}
```

FIG. 21

```
interface IInitActivationPropertiesIn : IUnknown
{   HRESULT SetClsctx ([in] DWORD clsctx);
    HRESULT SetClassInfo ([in,unique] IUnknown* pUnkClassInfo);
    HRESULT SetContextInfo ([in,unique] IContext* pClientContext,
                    [in] IContext* pPrototypeContext);
    HRESULT SetConstructFromStorage ([in,unique] IStorage* pStorage);
    HRESULT SetConstructFromFile ([in] WCHAR* wszFileName,
                    [in] DWORD dwMode);} interface IActivationPropertiesIn : IUnknown
{   HRESULT GetActivationID([out] GUID *pActivationID);
    HRESULT GetClassInfo([in] REFIID riid, [out,iid_is(riid)] void** ppv);
    HRESULT GetClsctx([out] DWORD *pclsctx);
    HRESULT AddRequestedIIDs([in] DWORD clfs,
                    [in, size_is(clfs)] IID *rgIID);
    HRESULT GetRequestedIIDs ([out] ULONG* pulCount, [out] IID** prgIID);
    // The following two methods are for activators who delegate onward.
    HRESULT DelegateGetClassObject([out] IActivationPropertiesOut
**pActPropsOut);
    HRESULT DelegateCreateInstance([in] IUnknown *pUnkOuter,
                    [out] IActivationPropertiesOut **pActPropsOut);
    // The following method is for activators who do NOT delegate onward.
    HRESULT GetReturnActivationProperties([in] IUnknown *pUnk,
                    [out] IActivationPropertiesOut **ppActOut);} interface IActivationPropertiesOut : IUnknown
{   HRESULT GetActivationID([out] GUID *pActivationID);
    HRESULT GetObjectInterface([in] REFIID riid,
                    [out, iid_is(riid)] void **ppv);
    HRESULT GetObjectInterfaces([in] DWORD clfs,
                    [in, size_is(clfs)] MULTI_QI *multiQi);}
```

372

ENVIRONMENT EXTENSIBILITY AND AUTOMATIC SERVICES FOR COMPONENT APPLICATIONS USING CONTEXTS, POLICIES AND ACTIVATORS

TECHNICAL FIELD

The present invention relates to system infrastructure and services that provide an object model or environment for hosting object-oriented component applications, and more particularly relates to extensibility of the object environment with added domain specific behaviors.

BACKGROUND OF THE INVENTION

Object models, such as the Microsoft Component Object Model ("COM"), define a standard structure of software objects that can be interconnected and collectively assembled into an application (which, being assembled from component objects, is herein referred to as a "component application"). The objects are hosted in an execution environment created by system services, such as the object execution environments provided by COM, as well as system services added by Microsoft Object Linking and Embedding ("OLE"), Microsoft Distributed Component Object Model (DCOM), and the Microsoft Transaction Server ("MTS") systems. These systems expose services for use by component application objects in the form of application programming interfaces ("APIs"), system-provided objects and system-defined object interfaces.

In accordance with object-oriented programming principles, the component application is a collection of object classes which each model real world or abstract items by combining data to represent the item's properties with functions to represent the item's functionality. More specifically, an object is an instance of a programmer-defined type referred to as a class, which exhibits the characteristics of data encapsulation, polymorphism and inheritance. Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related member functions of the object. In other words, the client programs do not access the object's data directly, but must instead call functions on the object's interfaces to operate on the data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class.

The object execution environments of the above mentioned COM, OLE, DCOM, and MTS systems have several behaviors towards component application objects that depend on locality or like environment aspects (hereafter referred to as "domains") of the component application objects. The domains of a component application object in these environments include physical location (e.g., machine and process), isolation domains (e.g., process, user/kernel, security, transactions, auditing), synchronization domains (e.g., apartments, activities), object lifetime and identity domains (e.g., persistence, just-in-time activation, assemblies, per-client global and shared state), and representation domains (e.g., unicode/ANSI, 16/32-bit, locale, native/automation, Java/COM). For example, the OLE object execution environment has behaviors for object persistence and local/remote transparency whose operation on an object depends on the object's location, e.g., machine and process. The MTS object execution environment has thread synchronization, automatic transactions, just-in-time object activation, declarative security and resource pooling behaviors that also are specific to an object's locality or other environment aspects that pertain to the object.

Although COM provides certain domain-specific behaviors in its object execution environment, COM lacks any structure or mechanism to extend the environment with new domain-specific behaviors. One problem is that such behaviors rely for their implementation on services that must automatically impose themselves into many interactions between objects, such as at object instantiation, upon passing an interface pointer, and during calls (function invocations and returns), preferably without relying on any programming or action on the part of the objects.

A further complication is that COM has services that provide processing during certain of the interactions, yet does not provide any mechanism to extend the service to also provide processing of new domain-specific behaviors. For example, COM has an object instantiation service (i.e., the "CoCreateInstance( )" API) that performs processing for certain system-provided environment behaviors at instantiation time, such as local/remote transparency.

Yet another complication is that certain inter-objects interactions do not involve any system-provided services in COM. For example, a call between two objects in a same process generally is made using a direct reference. Thus, no system service is invoked and afforded an opportunity to process domain-specific behaviors during these interactions.

The more recent MTS system extends the object execution environment of COM to include a number of additional domain-specific behaviors, including the before-mentioned thread synchronization, automatic transactions, just-in-time object activation, declarative security and resource pooling behaviors. However, the methods and mechanisms used in the MTS system to extend the COM object execution environment again fail to provide a general environment extensibility solution.

More specifically, one way in which the MTS system adds automatic services to extend the COM object execution environment is to provide a separate object instantiation service (the "IObjectContext::CreateInstance( )" function) that performs processing for the MTS domain-specific behaviors during object instantiation. This MTS object instantiation service is layered over the object instantiation service of COM (i.e., the "CoCreateInstance( )" API). In other words, after its domain-specific behavior processing, the MTS "IObjectContext::CreateInstance( )" function invokes the "CoCreateInstance( )" API to complete object instantiation processing (and domain-specific behaviors of COM).

This approach of layering separate new object instantiation services over that of the base system, however, has a number of drawbacks. First, in order to gain the full benefit of the domain-specific behavior, the new object instantiation service must be used in place of the base system's object instantiation service. This requires that the component application objects are rewritten to invoke the new service, or forgo the domain-specific behavior that the new service provides. In the MTS system for example, component application objects must be programmed to use the "IObjectContext::CreateInstance( )" function to create other component application objects. Otherwise, component application objects that are created via the "CoCreateInstance( )" API of the base COM system are not automatically placed in the same transaction as their creator, and do not have the full benefit of the MTS system's automatic transactions behavior. In many cases (e.g., for all previously developed and deployed legacy component applications), it may be impossible to rewrite the component applications to use new object instantiation services, which makes the new behaviors unattainable for such component applications.

Second, repeated use of the layering approach to add domain-specific behaviors to an environment can lead to competing layered services proliferating haphazardly. As a consequence, object developers may be forced to choose among the domain-specific behaviors of the object execution environment according to which of the competing layered services their component application objects are programmed to invoke. For example, suppose a new threading model behavior is provided in the COM object execution environment by (in part) layering yet another object instantiation service (e.g., a "CreateInNewThreadModel" API) over the "CoCreateInstance( )" API. Component application developers would then have to choose whether to program their component application objects to use this new object instantiation service so as to avail the component application of the new threading model behavior, or program the objects to use the "IObjectContext::CreateInstance( )" function to gain the domain specific behaviors of the MTS system (while forgoing the new threading model behavior).

Due to these disadvantages, the layering approach by itself does not provide an acceptable general solution to extending an object execution environment to incorporate new domain-specific behaviors.

As mentioned above, another complication to implementing automatic services to provide environment-extending, domain-specific behaviors is that no system-provided services are involved in certain inter-object interactions, such as calls within a same process in COM. The approach of the MTS system to overcome this difficulty is to replace the direct reference to an object with an indirect reference via a system-provided intermediary (termed a "safe reference"). The MTS system automatically provides the safe reference upon return from an object instantiation request, and on return from an interface query (e.g., using COM-defined "QueryInterface( )" function). However, an object is restricted from passing a direct interface pointer (e.g., to its own interfaces), and must first convert the direct interface to a safe reference via a call to a "SafeRef( )" API provided by the MTS system. The safe references of the MTS system also have the drawback that they provide processing for only certain domain-specific behaviors (those provided in the MTS system) during calls made using the safe reference. There is no provision made to allow processing for other domain-specific behaviors. So, repeating the safe reference approach for other domain-specific behaviors could again lead to a proliferation of competing types of "safe references."

The MTS system also implicitly associates a system-provided context object with each component application object hosted in the MTS execution environment. The context object encapsulates certain properties (e.g., a creator identity, a transaction, an activity, and security properties) that establish a "context" for the component application object within the MTS execution environment, and control certain of the environment's behaviors (e.g., automatic transactions, declarative security, etc.). However, the MTS object-context objects encapsulate properties specific to the domain-specific behaviors supported by the MTS system. Again, no structure is provided to readily extend the MTS object-context objects to support new domain-specific behaviors.

SUMMARY OF THE INVENTION

The present invention introduces contexts, policies, policy makers and activators that operate as general, extensible structure for automatic services to extend an object execution environment of an object-oriented system with domain-specific behaviors. According to an embodiment of the invention illustrated herein, independent aspects (e.g., threading model, declarative security, activity, transaction, etc.) of the object execution environment that are associated with objects are termed "domains." A group of one or more component application objects in the execution environment that share a common set of domains (i.e., are at an intersection of domains in the environment) are said to be in a "context." The illustrated embodiment represents the context as a context object that contains an ordered list of context property objects. The context property objects represent the domains and may be shared by more than one context.

Policies are automatic services that trigger on calls between contexts to provide the extensible domain-specific behaviors in the execution environment. In the illustrated embodiment, policies are represented as policy objects. The policy objects act as sinks for context events that are delivered on calls between component application objects which cross context boundaries. The context events include call and return events on a client side of the cross-context call, and enter and leave events on a server side of the call. (The term "client" is used to refer to the component application object making a call, whereas "server" refers to the recipient of the call.) The policy objects thus implement the semantics of entering or leaving a domain.

As per conventional COM practice, an object makes calls to other objects using a reference to the other object. Where the other object is in the same context, the reference is a direct pointer to the other object. In the illustrated embodiment however, the reference is via a proxy whenever the other object is in another context. This proxy has a policy set, which is a collection of policy objects to which context events are delivered when a call is made using the reference. The policy set can include both client-side policy objects that are delivered call and return events, and server-side policy objects that are delivered enter and leave events. A policy may have policy objects on each side, which may exchange a buffer of data. Other events also can be delivered to the policy objects, such as "AddRefPolicy" and "ReleasePolicy" events.

Typically, the policy set includes policy objects that provide domain-specific behaviors for the domains that differ between the client and server-side contexts. For example, where the client and server contexts have different apartments and transactions, the policy set may include policy objects that support behaviors for apartment threading and automatic transactions. Where the client and server contexts have the same apartment but different transactions, the policy set may include only policy objects for the automatic transactions behavior. The policy sets thus reflect domain differences between contexts.

The policy set of a reference to an object in another context is built using policy makers. The policy makers correspond to the properties of a context. In fact, the context property objects in the illustrated embodiment may also act as policy makers for the domains that they represent (in which case they also are termed "policy maker objects"). At the time a client object obtains a reference to a server object (more specifically, at unmarshaling such a reference in the illustrated embodiment), a request is sent to each of the policy makers in both client and server contexts to contribute policies to the policy set. Typically, the policy maker does not add a policy to the policy set of the cross-context reference if both client and server contexts have the identical property. In this way, an optimal policy set is built for the cross-context reference that includes policy objects for just the domains that differ between the contexts. The policy maker can add itself as the policy object, so that the same object can act as the context property object, policy maker object and policy object for a domain.

The context of an object is initialized at the time of an object instantiation request using activators. An object instantiation service (e.g., the "CoCreateInstance( )" API) delegates responsibility for activation of the requested object in the correct context through a possibly distributed chain of activators. Activators in the chain can modify the context properties, then delegate on to a next activator. The activator chain can include custom activators specific to the requested object's class, the client context, and context properties (i.e., domains), as well as system-provided default or general activators. In the illustrated implementation of the invention, custom activators can be supplied for a particular class of object to be invoked at each of plural activation stages for the context, apartment, process and machine. Further, the activators perform context initialization as a function of properties of the client context (i.e., that of the object that issued the instantiation request), as well as properties of the object class being instantiated (e.g., which may be set by configuration information registered for the class in the configuration database or registry of the operating system). Often, the activator chain simply chooses the client context as the context of the requested object. However, where one or more of the context properties are modified, the activators activate the requested object in another context or create a new context in which to activate the requested object, as appropriate.

Activators allow context initialization to be extended to account for extensions to contexts. For example, an activator can be added to the activator chain to properly initialize contexts for a new context property object, policy maker object and policy object that provide a new domain and domain-specific behavior in the object execution environment. Object instantiation requests can continue to be made directly to the object instantiation service, so that context initialization for the added domain-specific behavior occurs automatically as an object execution environment behavior.

Additional features and advantages of the invention will be made apparent from the following detailed description of an illustrated embodiment which proceeds with reference to the accompanying drawings.

BRIEF DESCRIPTION OF THE DRAWINGS

FIG. 5 is a program listing defining an "IObjectContext" interface of the object context object of FIG. 4.

FIG. 6 is a block diagram of a cross-context reference and policy set in the extensible object execution environment of FIG. 3 for the same apartment case.

FIG. 7 is a block diagram of a cross-context reference and policy set in the extensible object execution environment of FIG. 3 for the cross-apartment, cross-process, and/or cross-machine case.

FIG. 8 is a program listing defining an "IPolicy" interface of a policy object in the cross-context references of FIGS. 6 and 7.

FIG. 10 is a program listing defining an "IPolicySet" interface of the policy set object of FIG. 9.

FIG. 11 is a program listing defining an "IPolicyMaker" interface of policy makers in the object context object of FIG. 4.

FIG. 16 is a program listing defining an "wrapper" interface of a wrapper object in the same apartment, cross-context reference implementing data structures of FIG. 13.

FIG. 17 is a program listing defining an "ICtxChannel" interface of a context channel object in the same apartment, cross-context reference implementing data structures of FIG. 13.

FIGS. 20 and 21 are program listings defining interfaces used in the activation chain of FIG. 18.

DETAILED DESCRIPTION OF THE INVENTION

The present invention is directed toward a method and system for object execution environment extensibility using contexts, policies, policy makers and activators. In one embodiment illustrated herein, the invention is incorporated into an object services component, entitled "COM+," of an operating system, entitled "Microsoft Windows NT Server 5.0," marketed by Microsoft Corporation of Redmond, Wash. Briefly described, this software is a scaleable, high-performance network and computer operating system supporting distributed client/server computing, and providing an object execution environment for component applications conforming to COM. The COM+ component incorporates object services from prior object systems, including Microsoft Component Object Model (COM), Microsoft Object Linking and Embedding (OLE), Microsoft Distributed Component Object Model (DCOM), and Microsoft Transaction Server (MTS). In the following discussion, "COM" is used to refer to the object model defined in the Microsoft Component Object Model, whereas "COM+" refers to the system services, system-provided objects and system-defined interfaces of the COM+ object services component of Microsoft Windows NT 5.

Exemplary Operating Environment

Figure 1:
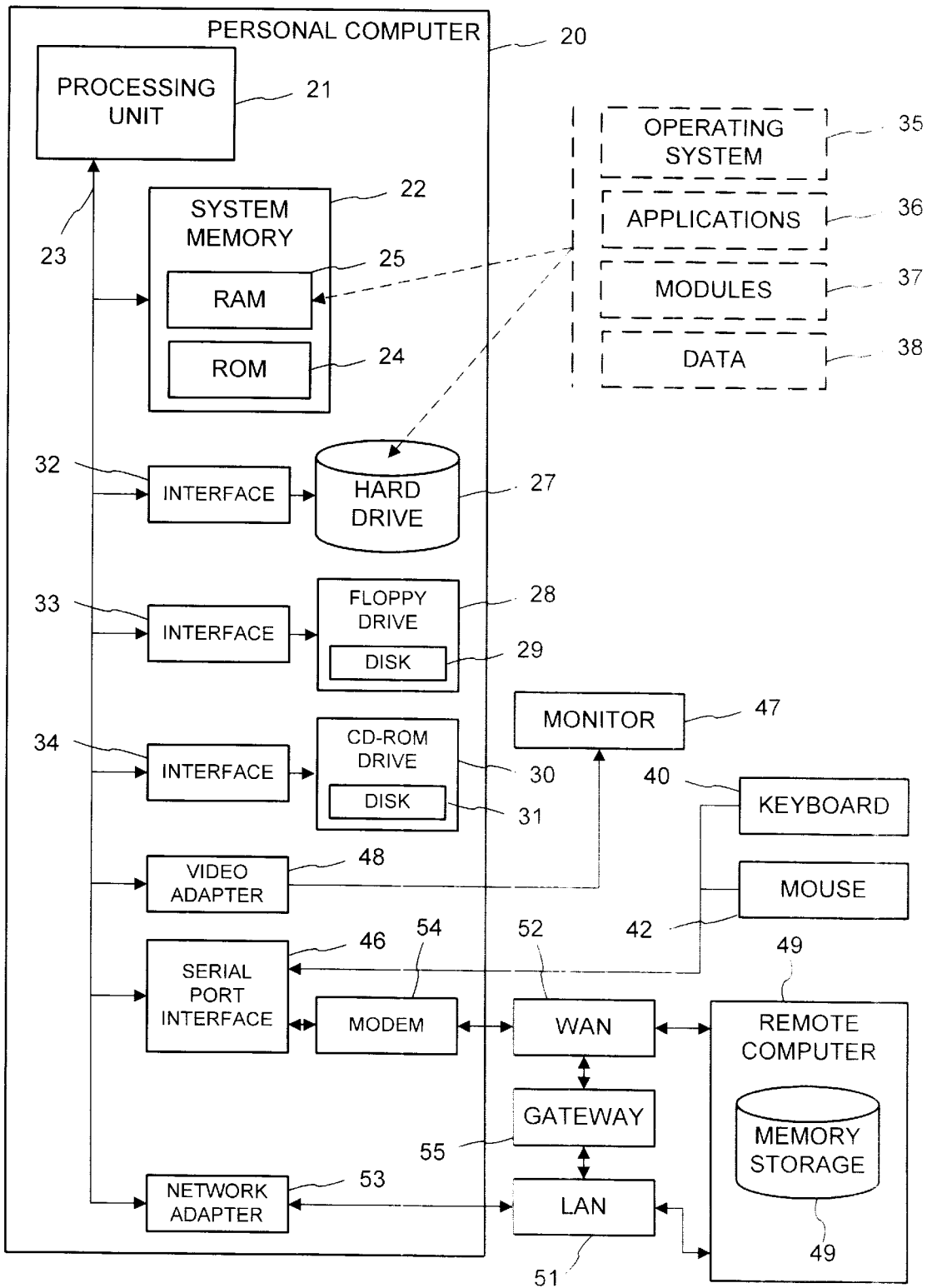
FIG. 1 is a block diagram of a computer system that may be used to implement a method and apparatus embodying the invention for object execution environment extensibility.

FIG. 1 and the following discussion are intended to provide a brief, general description of a suitable computing environment in which the invention may be implemented. While the invention will be described in the general context of computer-executable instructions of a computer program that runs on a computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The illustrated embodiment of the invention also is practiced in distributed computing environments where tasks are performed by remote processing devices that are linked through a communications network. But, some embodiments of the invention can be practiced on stand alone computers. In a distributed computing environment, program modules may be located in both local and remote memory storage devices.

With reference to FIG. 1, an exemplary system for implementing the invention includes a conventional computer 20 (such as personal computers, laptops, palmtops, set-tops, servers, mainframes, and other variety computers), including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 24 and random access memory (RAM) 25. A basic input/output system (BIOS), containing the basic routines that help to transfer information between elements within the computer 20, such as during start-up, is stored in ROM 24.

The computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38.

A user may enter commands and information into the computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as a remote computer 49. The remote computer 49 may be a server, a router, a peer device or other common network node, and typically includes many or all of the elements described relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications (e.g., via the LAN 51 and a gateway or proxy server 55) over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Component Application Object Overview

Figure 2:
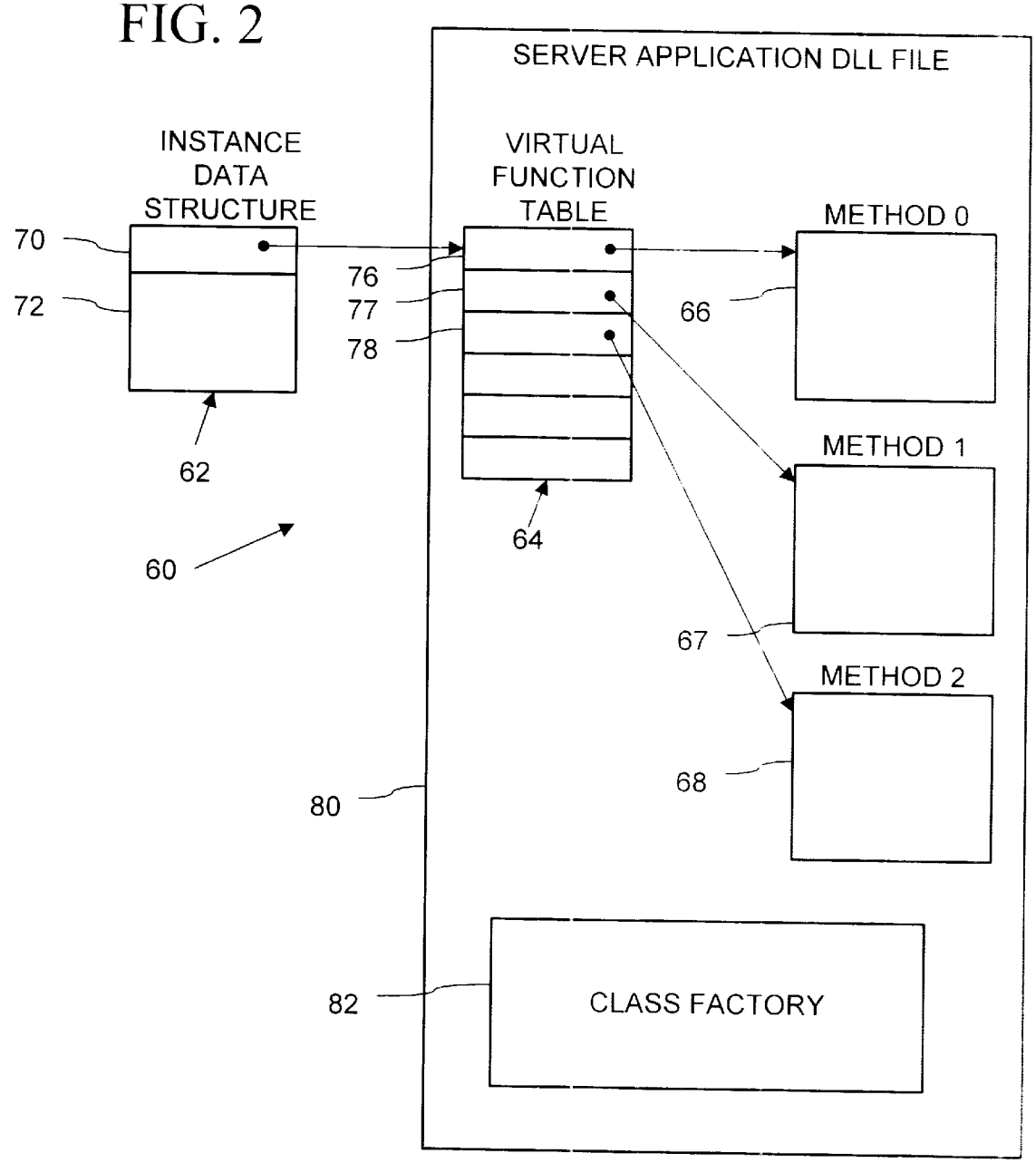
FIG. 2 is a block diagram of a component application object.

With reference now to FIG. 2, the computer 20 (FIG. 1) executes component applications that are developed as a package of component application objects. In the illustrated embodiment of the invention, the component application objects conform to the Microsoft Component Object Model ("COM") specification (i.e., are implemented as a "COM Object" 60) and executed using the COM+ services of the Microsoft Windows NT Server 5.0 operating system as stated above, but alternatively may be implemented according to other object standards (including the CORBA (Common Object Request Broker Architecture) specification of the Object Management Group) and executed under object services of another operating system. The COM specification defines binary standards for objects and their interfaces which facilitate the integration of software components into applications. (For a detailed discussion of COM and OLE, see Kraig Brockschmidt, *Inside OLE, Second Edition*, Microsoft Press, Redmond, Wash. (1995)).

In accordance with COM, the COM object 60 is represented in the computer system 20 (FIG. 1) by an instance data structure 62, a virtual function table 64, and member functions 66–68. The instance data structure 62 contains a pointer 70 to the virtual function table 64 and data 72 (also referred to as data members, or properties of the object). A pointer is a data value that holds the address of an item in memory. The virtual function table 64 contains entries 76–78 for the member functions 66–68. Each of the entries 76–78 contains a reference to the code 66–68 that implements the corresponding member function.

The pointer 70, the virtual function table 64, and the member functions 66–68 implement an interface of the COM object 60. By convention, the interfaces of a COM object are illustrated graphically as a plug-in jack as shown for the component application objects 110–118 in FIG. 3. Also, interfaces conventionally are given names beginning with a capital "I." In accordance with COM, the COM object 60 can include multiple interfaces, which are implemented with one or more virtual function tables. The member function of an interface is denoted as "IInterfaceName-::FunctionName."

The virtual function table 64 and member functions 66–68 of the COM object 60 are provided by an object server program 80 (hereafter "object server DLL") which is stored in the computer 20 (FIG. 1) as a dynamic link library file (denoted with a ".dll" file name extension). In accordance with COM, the object server DLL 80 includes code for the virtual function table 64 and member functions 66–68 of the classes that it supports, and also includes a class factory 82 that generates the instance data structure 62 for an object of the class.

Other objects and programs (referred to as a "client" of the COM object 60) access the functionality of the COM object by invoking the member functions through the COM object's interfaces. First however, the COM object must be instantiated (i.e., by causing the class factory to create the instance data structure 62 of the object); and the client must obtain an interface pointer to the COM object.

Before the COM object 60 can be instantiated, the object is first installed on the computer 20. Typically, installation involves installing a group of related objects called a package. The COM object 60 is installed by storing the object server DLL file(s) 80 that provides the object in data storage accessible by the computer 20 (typically the hard drive 27, shown in FIG. 1), and registering COM attributes (e.g., class identifier, path and name of the object server DLL file 80, etc.) of the COM object in the system registry. The system registry is a configuration database.

A client requests instantiation of the COM object using system-provided services and a set of standard, system-defined component interfaces based on class and interface identifiers assigned to the COM Object's class and interfaces. More specifically, the services are available to client programs as application programming interface (API) functions provided in the COM+ library, which is a component of the Microsoft Windows NT Server 5.0 operating system in a file named "OLE32.DLL." Also in COM+, classes of COM objects are uniquely associated with class identifiers ("CLSIDs"), and registered by their CLSID in a system configuration database referred to as the "registry." The registry entry for a COM object class associates the CLSID of the class with information identifying an executable file that provides the class (e.g., a DLL file having a class factory to produce an instance of the class). Class identifiers are 128-bit globally unique identifiers ("GUIDs") that the programmer creates with a COM+ service named "CoCreateG-UID" (or any of several other APIs and utilities that are used to create universally unique identifiers) and assigns to the respective classes. The interfaces of a component additionally are associated with interface identifiers ("IIDs").

In particular, the COM+ library provides an API function, "CoCreateInstance( )," that the client program can call to request creation of a component using its assigned CLSID and an IID of a desired interface. In response, the "CoCreateInstance( )" API looks up the registry entry of the requested CLSID in the registry to identify the executable file for the class. The "CoCreateInstance( )" API function then loads the class' executable file, and uses the class factory in the executable file to create an instance of the COM object 60. Finally, the "CoCreateInstance( )" API function returns a pointer of the requested interface to the client program. The "CoCreateInstance( )" API function can load the executable file either in the client program's process, or into a server process which can be either local or remote (i.e., on the same computer or a remote computer in a distributed computer network) depending on the attributes registered for the COM object 60 in the system registry.

Once the client of the COM object 60 has obtained this first interface pointer of the COM object, the client can obtain pointers of other desired interfaces of the component using the interface identifier associated with the desired interface. COM+ defines several standard interfaces generally supported by COM objects including the "IUnknown" interface. This interface includes a member function named "QueryInterface( )." The "QueryInterface( )" function can be called with an interface identifier as an argument, and returns a pointer to the interface associated with that interface identifier. The "IUnknown" interface of each COM object also includes member functions, "AddRef( )" and "Release( )", for maintaining a count of client programs holding a reference (e.g., an interface pointer) to the COM object. By convention, the "IUnknown" interface's member functions are included as part of each interface on a COM object. Thus, any interface pointer that the client obtains to an interface of the COM object 60 can be used to call the QueryInterface function.

Component Application Execution Environment

Figure 3:
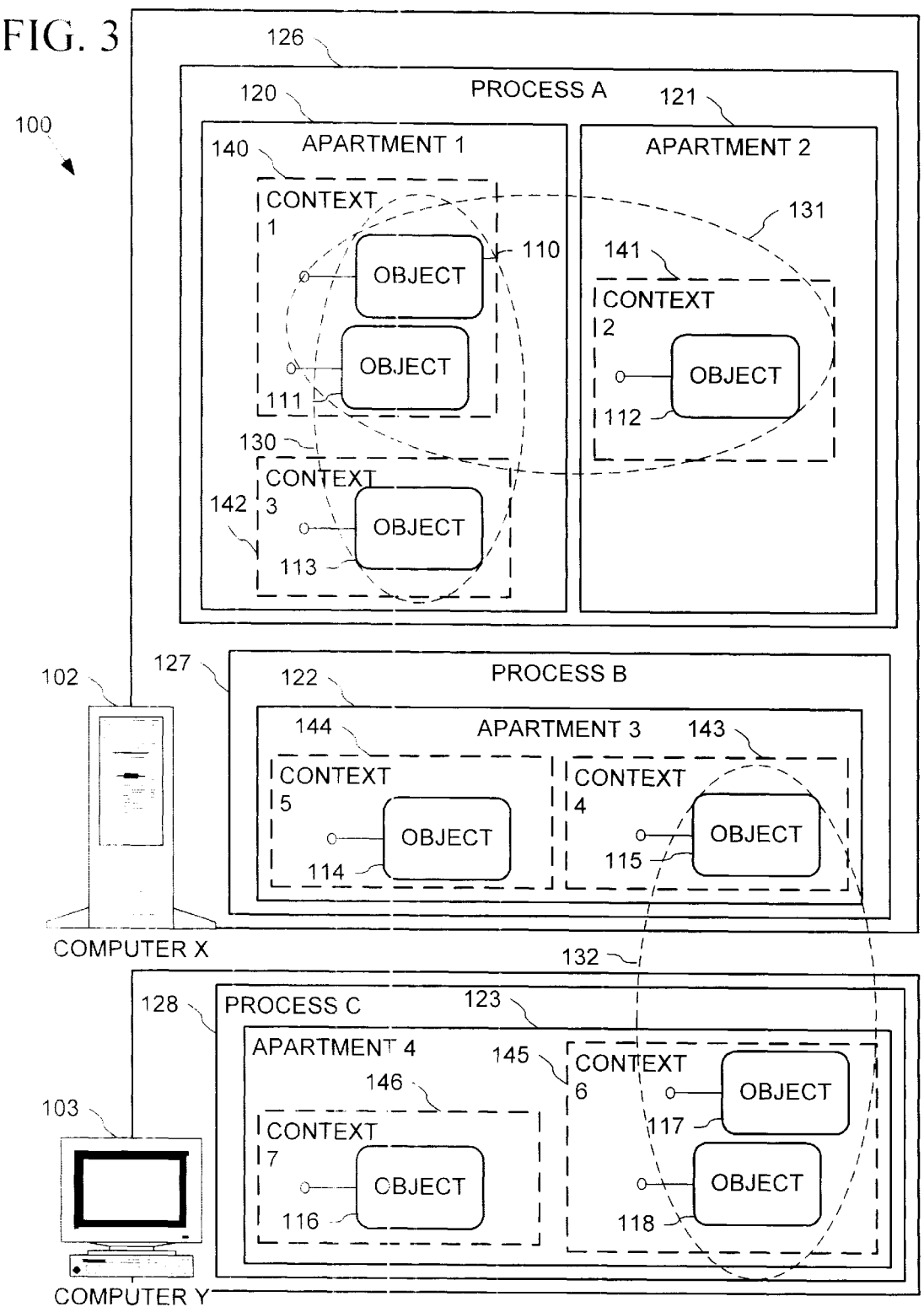
FIG. 3 is a block diagram of an extensible object execution environment running on a distributed network of computers such as that shown in FIG. 1, in which component application objects (such as shown in FIG. 2) at an intersection of domains are associated in contexts according to the invention.

With reference to FIG. 3, component application objects 110–118 execute on computers 102–103 (such as the computer 20 of FIG. 1) within an extensible object execution environment 100 of the COM+ services that can be extended to incorporate additional domain-specific behaviors according to an illustrated embodiment of the invention. In the illustrated environment 100, the component application objects 110–118 each execute within particular domains. The domains are independent aspects of the environment that contain a group of like-aspected component application objects (e.g., environment aspects that cause the objects to be treated alike by an environment behavior specific to the domain), and effectively establish a boundary about the group.

Domains in the illustrated environment 100 include a locality domain, which is a machine (e.g., computers 102–103), process (e.g., processes 126–128) and apartment (e.g., apartments 120–123) in which the object resides. Accordingly, each apartment 120–123 of the illustrated environment 100 is a separate domain. As is well known in the industry, a process is an executing program state in the Microsoft Windows NT and like operating systems that consists of a private virtual address space, program code and data, and other operating system resources, such as files, pipes, and synchronization objects that are visible to the process. A process also contains one or more threads that run in the process. A thread is a basic entity to which the Microsoft Windows NT and like operating systems allocate processing time on the computer's processing unit (e.g., processing unit 21 of FIG. 1) for instruction execution. An apartment is an entity in accordance with a threading model, such as the single-threaded apartment (STA) or multi-threaded apartment (MTA) threading models, among others. For example, an apartment according to the STA threading model consists of program code (e.g., a group of objects) that resides or runs on only a particular thread (e.g., the thread on which the object is created).

The domains in the illustrated environment 100 also include other aspects of the execution environment of the objects 110–118, such as security role for a role-based security behavior or transaction for an automatic transaction behavior of the types provided in the MTS system. Exemplary such domains 130–132 are shown in FIG. 3 as dotted lines in oval shape. The domains (including the locality domains that are coextensive with apartments 120–123 and the exemplary domains 130–132) may arbitrarily intersect and nest.

Contexts

With reference still to FIG. 3, a context in the illustrated object execution environment 100 conceptually is an intersection of the domains. For example, contexts 140–146 are formed at the intersections of the locality domains of apartments 120–123 with the exemplary other domains 130–132. Further, a set of one or more of the objects 110–118 in the same domains are in a same context. For example, the objects 110–111 are at the intersection of domains 120, 130 and 131, and therefore are in the same context 140. All of the component application objects 110–118 are in a context 140–146. Further, since the apartments 120–123 constitute domains of the illustrated environment 100, the contexts 140–146 are all within (i.e., smaller or equal in scope to) the apartments 120–123.

Figure 4:
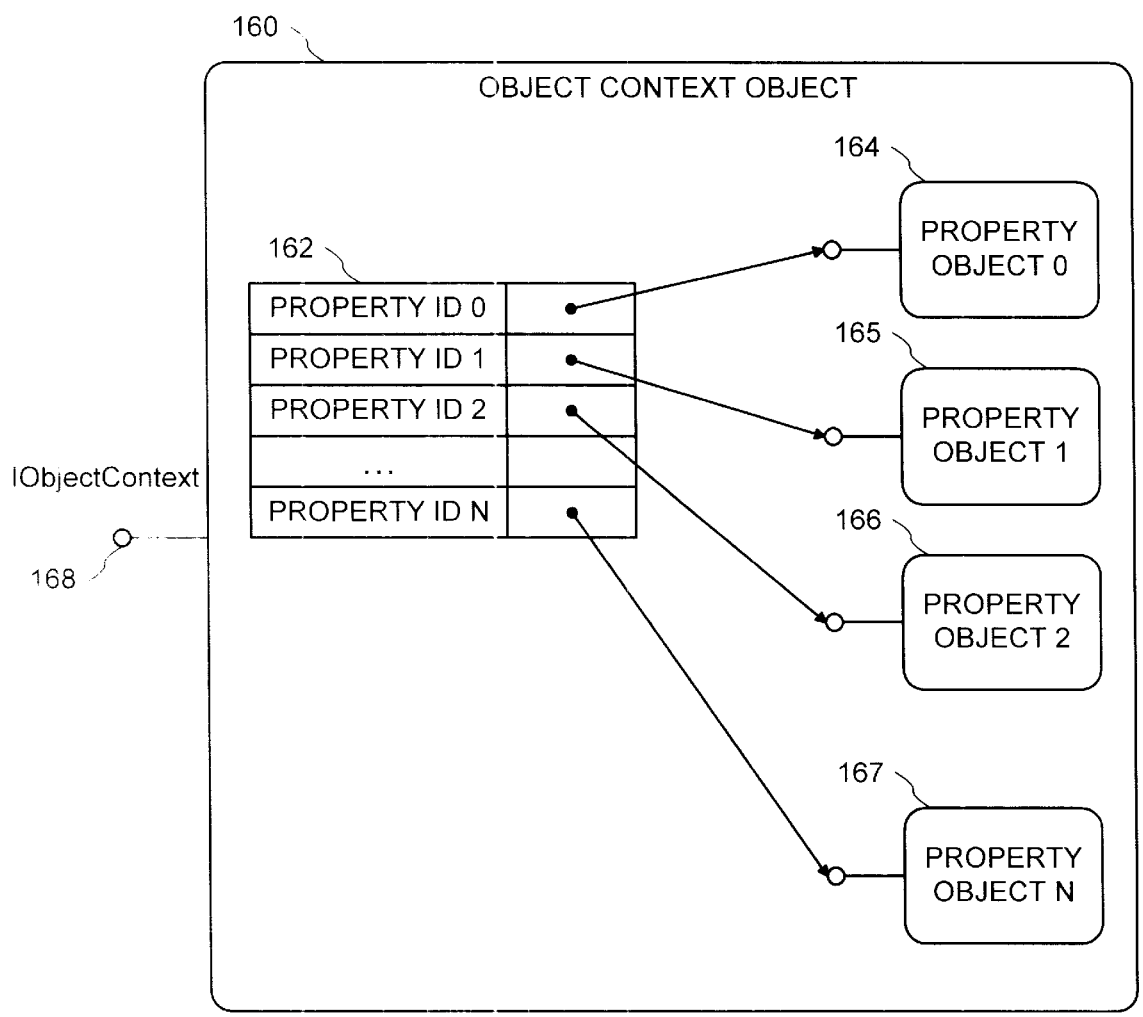
FIG. 4 is a block diagram of an object context object that represents a context in the extensible object execution environment of FIG. 3.

With reference now to FIG. 4, the contexts 140–146 (FIG. 3) each are represented in COM+ as an object context object 160. The object context object 160 is implemented as a COM object, which is automatically provided by the COM+ system and associated with the component application objects in the context as described below. All objects 110–118 in the illustrated environment 100 (FIG. 3) are within a context, and have an association to the object context object 160 that represents the context. This association is maintained at run-time by the COM+ run-time services, and the object context object associated with a component application object can be retrieved via a call to a "CoGetObjectContext( )," API of COM+. Objects that are in a same context of the environment (e.g., objects 110–111 in context 140, or objects 117–118 in context 145) share a same object context object 160 that represents the context.

The object context object 160 encapsulates a set of context properties that characterize the domains whose intersection forms the context. More specifically, the object context object has a property table 162, which is an ordered list of (context property identifier, context property object reference) value pairs. The context property identifier is a globally unique identifier (GUID) that identifies the context property. The context property object reference is a pointer to a context property object 164–167 that represents the domain's characteristics. The contexts 140–146 of the component application objects 110–118 in the illustrated environment 100 are immutable during the component application objects' lifetimes. Accordingly, once the object context object for a context is set up (generally at instantiation of a first object in the context), the context properties of the object are frozen to prevent any changes. In alternative implementations of object context objects, the context properties need not be frozen.

The object context object 160 supports an "IObjectContext" interface 168 as defined in the program listing 170 shown in FIG. 5. The "IObjectContext" interface 168 provides member functions to set or get the context property object for a given context property identifier, and to enumerate the context property objects of the object context object in order. The "IObjectContext" interface 168 also provides a member function to prevent further modification of its context properties (i.e., to freeze the context) after set-up.

Policies

With reference to FIGS. 6 and 7, the environment behaviors specific to the domains (including the apartments 120–123 and other domains 130–132) in the illustrated environment 100 (FIG. 3) are realized in part by policies that respond to context events triggered on calls made between objects in separate contexts (i.e., across context boundaries). The context events allow the policies to respond automatically when the logical execution sequence of the component application crosses a context boundary to enforce the domain-specific behaviors, without the component application objects having to explicitly invoke the behaviors (e.g., in the programming of the component application's code). The policies thus implement the semantics of entering or leaving a domain. In response to a context event, the policy can perform various processing of its domain-specific behavior, such as having a side effect (e.g., initiate a transaction, such as in the automatic transaction behavior), passing information to its partner policy in the other context, failing the call, forcing a different return value, or short-circuit the call (e.g., acting as a handler).

The policies are implemented as policy objects 180, which are COM objects denoted by triangles in FIGS. 6 and 7. The policy objects 180 all support an "IPolicy" interface (defined as shown by the program listing 181 of FIG. 8), which acts as a sink for the context events. The context events include context events that are delivered to policies on a client-side of the call (i.e., the object that issued the call), which include "call" and "return" context events (herein termed "client-side context events"). The context events delivered to policies on a server-side of the call include "enter" and "leave" context events (herein termed "server-side context events"). The policy objects can send a buffer of data to a counterpart policy object of a same domain on the other side of the call, which is delivered to the counterpart policy object with the context events for its respective side of the call. Context events also are delivered to policy objects at times other than during a call to the server object. Specifically, the program listing 181 defines a "ReleasePolicy" context event which is delivered to server object's policy objects when a policy object is removed from a policy set (described below), and an "AddRefPolicy" context event which is delivered when a policy object is added to a policy set.

Cross-Context Object References and Policy Sets

In COM+, a reference to an object in another context (herein termed a "cross-context object reference" 182–183) is indirect via an object context switcher. For example, a reference held by the object 110 in the context 140 (FIG. 3) to the object 112 in the context 141 (FIG. 3) is a cross-context object reference via an object context switcher. A reference to an object in a same context is a direct pointer. For example, the object 117 in the context 145 (FIG. 3) can hold a reference to the object 118 also in the context 145 (FIG. 3) which is a direct interface pointer.

In the case where a client component application object 190 is in the same apartment as a server component application object 192 (i.e., a same apartment, cross-context reference 182), the object context switcher is a wrapper 184 (FIG. 6). The wrapper 184 is a light-weight type proxy in the sense that the wrapper 184 does not perform marshaling (i.e., transferring data, such as call parameters, between address spaces of the client and server localities, such as the virtual address spaces of different processes or computers). Instead, the wrapper 184 simply performs processing for the context switch, such as by issuing context events to the policies 180. In the case where the client and server component application objects 190, 192 are in different apartments or processes (i.e., a cross-apartment or process, cross-context reference 183), the object context switcher is implemented as a proxy 186 and stub 187 pair, which performs marshaling as well as context switching. For marshaling, the proxy 186 and stub 187 pair utilize the COM RPC Standard Marshaling Architecture of OLE and DCOM, which is described, inter alia, in Brockschmidt, *Inside OLE, Second Edition* 277–340 (1995), with added support for contexts as described below.

Further, the cross-context object references 182–183 have associated policy sets 194–196. The policy sets 194–196 are collections of the policy objects 180 that receive context events for calls from a specific client context 198 to a specific server context 199 (e.g., from the context 140 to the context 141 in FIG. 3). The COM+ services maintain a single policy set to receive the context events for calls from a given originating context to a given destination context, which is shared by all cross-context references held by objects in the originating context to objects in the destination context. A different policy set may be maintained for references in the reverse direction. In the case of the same apartment, cross-context reference 182, the wrapper 184 has a single policy set that contains both client-side and server-side policy objects 188–189. In the case of the cross-apartment or process, cross-context reference, the proxy 186 and the stub 187 have separate policy sets for the client-side policy objects 188 and the server-side policy objects 189, respectively.

When a call is made on the cross-context object reference, the object context switcher delivers context events to the policy objects 180 in the policy set 194–196, both before (for the call and enter events) and after (for the leave and return events) the object context switcher passes the call through to the server object. The policy objects 180 in the policy set are composed in some order. The object context switcher delivers the context events to the policy objects in this order on the call and enter events, and in reverse order for leave and return events.

Figure 9:
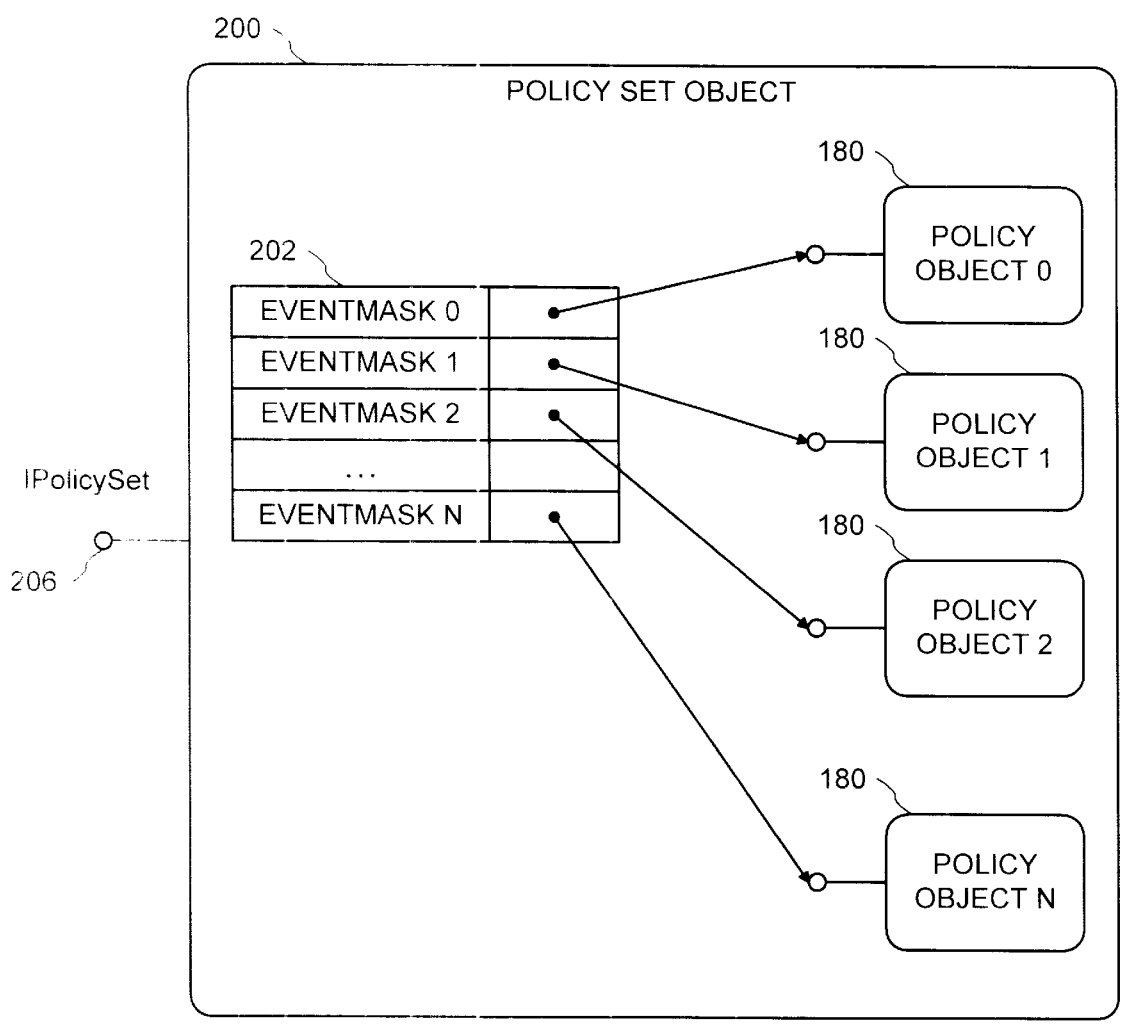
FIG. 9 is a block diagram of a policy set object that represents the policy set in the cross-context references of FIGS. 6 and 7.

With reference to FIG. 9, the policy sets 194–196 (FIGS. 6 and 7) each are implemented as a policy set object 200 (a COM object) that encapsulates an ordered list 202 of policy records. Each policy record contains an event mask, policy identifier, and policy object reference for a particular policy object 180 in the policy set. The event mask is a set of Boolean flags that indicate which context events are to be issued to the respective policy object during a call on a cross-context reference having the policy set. The policy identifier is a unique identifier (a GUID) that indicates the policy represented by the policy object 180. The policy object reference is an interface pointer to the policy object 180. In some embodiments of the invention, the policy set object 200 can be implemented in a same object as the object context switcher (e.g., the wrapper 184 or proxy 186 and stub 187). Alternatively, the policy set object 200 can be a separate object with a private interface to the object context switcher, through which the policy set object 200 is notified of the context events to issue to its policy objects 180.

The policy set object 200 supports an IPolicySet interface 206 shown in the program listing 208 of FIG. 10. The IPolicySet interface 206 has member functions to build the collection of policy objects 180. An "AddPolicy( )" member function specifies information for a policy record to add to the policy set object's ordered list 202. In some alternative implementations, the "AddPolicy( )" member function can contain ordering information that specifies where the added policy is to be placed in the order of the policies in the policy set. When called, the "AddPolicy( )" member function causes the "AddRefPolicy" context event to be delivered to policy objects in the policy set. A "Freeze( )" member function is called when building the policy set is completed, which prevents any further additions to the ordered list 202.

Policy Makers

With reference to FIG. 11, the object context object 160 (FIG. 4) contains policy makers that dynamically construct the policies 180 and policy sets 194–196 for the cross-context references 182–183 (FIGS. 6 and 7). In COM+, the policy makers are simply those of the context property objects 164–167 that implement an "IPolicyMaker" interface defined in a program listing 210 shown in FIG. 11. At reference transfer time (more specifically, on unmarshaling a reference to the server object into another context), the policy makers in the object context objects of the client context 198 and server context 199 contribute policies 180 (FIGS. 6 and 7) and determine their order in the policy set 194–196, as described more fully below. As noted above, the context property objects 164–167 listed in an object context object 160 (and therefore also its policy makers) is static and immutable after creation and set-up of the object context object.

The IPolicyMaker interface includes an "AddPolicies( )" member function that is called when a cross-context reference from or to the context represented by the object context object 160 is formed. The "AddPolicies( )" member function determines whether to add any policy objects for its respective context property to the policy set for the cross-context reference, and the context events that such policy object(s) should receive. The parameters of the "AddPolicies( )" member function specify the policy set to which any policy objects are to be added (the "pset" parameter), a value indicating the type of context marshaling (the "cm" parameter), and the other context of the cross-context reference (the "pctxtdest" parameter). The policy maker calls the "AddPolicy( )" member function on the "IPolicySet" interface 206 (FIG. 10) of the policy set object 200 (FIG. 9) for each such policy object to add that policy object to the policy set. The policy makers in the object context object of the client side context 198 (FIGS. 6 and 7) add only the client-side policy objects 188 to the policy set 194–196, while policy makers for the server side context 199 add only server-side policy objects.

Envoys

In the illustrated extensible object execution environment 100, the policy makers in the server-side context 199 also can contribute special policies called "envoy policy objects" to the client-side policy objects 188 in the client-side policy set 195 (FIG. 7). The server-side policy maker can contribute such envoy policy objects to act as sinks for client-side context events. On receiving these events, the envoys can pass information from the client-side context to server-side policy objects 189. In the illustrated environment, the server-side policy maker (or simply a context property object) that contributes an envoy policy object implements an "IMarshalEnvoy" interface. Such policy makers are called "envoys." In alternative implementations, the server-side policy maker may identify itself as an envoy to be marshaled into a client's context by setting a context marshaling flag (e.g., as shown in FIG. 11) that indicates the policy maker is an envoy. During marshaling of a server object reference across apartments, processes, or machines, the server context object along with all its context property objects that implement the "IMarshalEnvoy" interface are marshaled along with the reference as part of the reference marshaling process described more fully below. When unmarshaled at the client-side, the envoys may contribute a client-side policy object to the client-side policy set. The envoy preferably is marshaled using copy-by-value marshaling, which does not add to the server-side context property object's reference count.

Cross-Context Reference Tracking Structures

With reference again to FIGS. 3 and 12, the COM+ runtime services 220 (FIG. 12) (provided by the COM+ component of the Windows NT 5.0 operating system as stated above) in the illustrated extensible object execution environment 100 (FIG. 3) maintain data structures to track object contexts for use during cross-context reference creation. In particular, the COM+ runtime services 220 maintain a wrapper table, a policy set table and a registration information table per each process (e.g., the process 126) in the environment 100 (called the process-wide tables). These tables contain information on a process-wise basis to facilitate sharing common interface proxies for the server object across all client contexts.

Alternative implementations of the invention can use other data structures for object context tracking, such as multiple level indexes, caches, etc. In particular, some alternative implementations of the invention can maintain wrapper and policy set tables on a per context or other basis, rather than maintain tables used globally in each process. This is particularly useful in an alternative implementation of the invention in which a separate wrapper to the server object is provided for each client context. In the case of per context tables, a global table or set of tables indexed by client context may provide an initial look-up of the appropriate per context wrapper and policy set tables.

Wrapper Table

As described more fully below and shown in FIG. 13, the COM+ runtime services 220 use a single wrapper object 230 to implement the same-apartment, cross-context references 184 across all client contexts inside the server object's apartment. The wrapper table 222 tracks on a process-wide basis an association (or mapping) of the server objects to their respective wrapper objects. The server object's identity is represented by the server object's "IUnknown" interface 231 pointer. This pointer is used as an index into the wrapper table to return the server object's associated wrapper object 230.

Policy Set Table

Given a client context and server context pair in the illustrated environment 100, there exists a unique policy set that contains client-side and server-side policy objects to which client-side and server-side call events are respectively delivered when a call is made from the client context to the sever context. The policy set table 224 provides a mapping of a pair of contexts in the illustrated environment 100 to a policy set that provides the context switching between the contexts. The policy set table 224 thus is indexed by a client and server context pair ("CCTXT" and "SCTXT") to look up their respective policy set. The context pairs to policy set relationships maintained by policy set table are not symmetric. More particularly, two contexts A and B may map to a different policy set when A is the client context and B is the server context, than when A is the server context and B is the client context.

Registration Table

The registration table 226 tracks registration information as to the cross-context references held by clients to the server object. The registration table 226 associates a client and server context pair together with the server object (identified by its "IUnknown" interface pointer) to this registration information. The registration information contains the number of references and the list of interfaces held legally by clients in one client context on the server object in the server object's context. In some alternative implementations of the invention, the registration table can be integrated with the policy set table, so that the registration information for a client and server context pair is kept in one table together with the policy set information.

Cross-Context Reference Creation at Marshal Time

Figure 14:
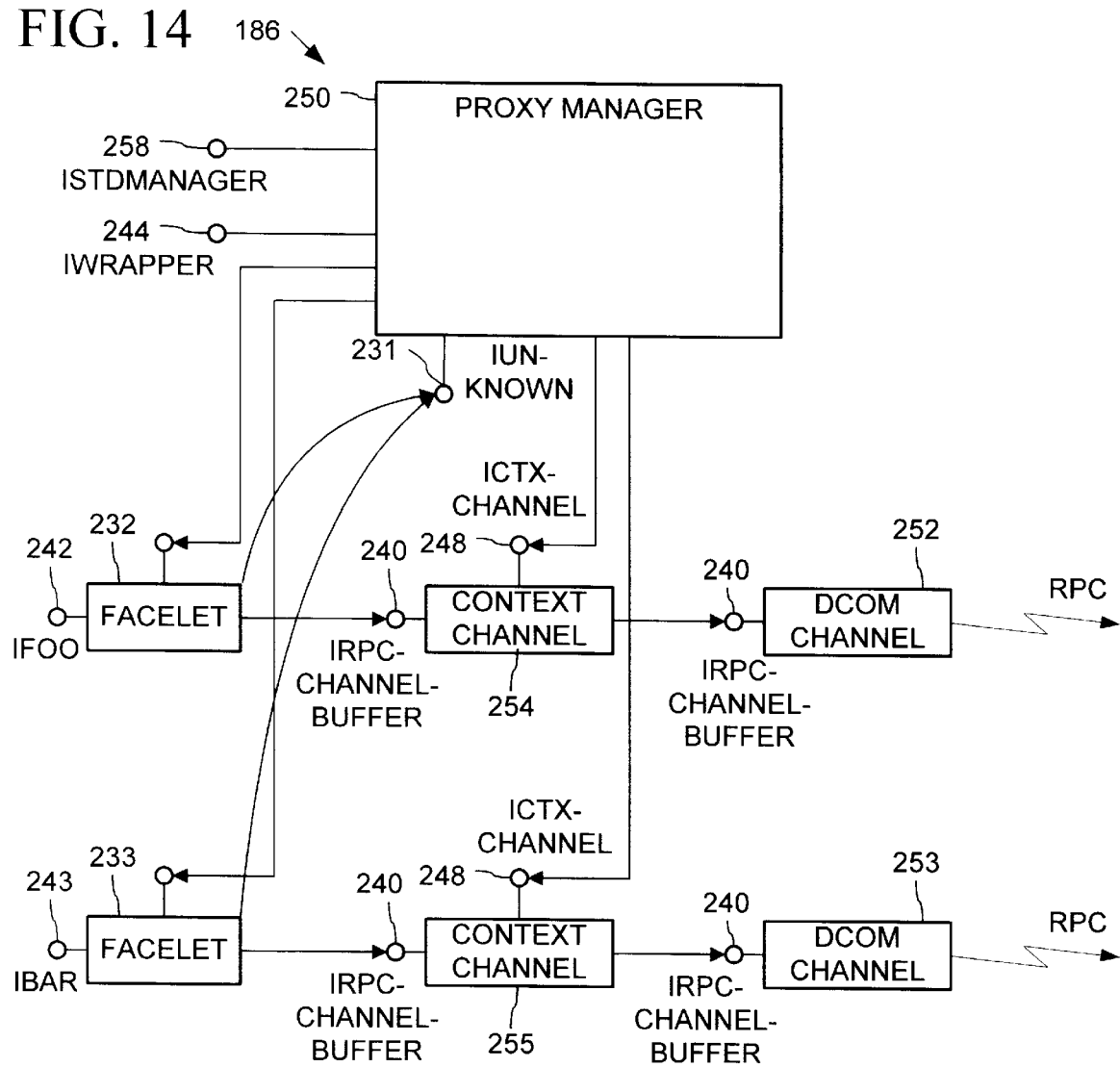
FIG. 14 is a block diagram of data structures implementing a client side of the cross-apartment or -process, cross-context reference of FIG. 7.
Figure 15:
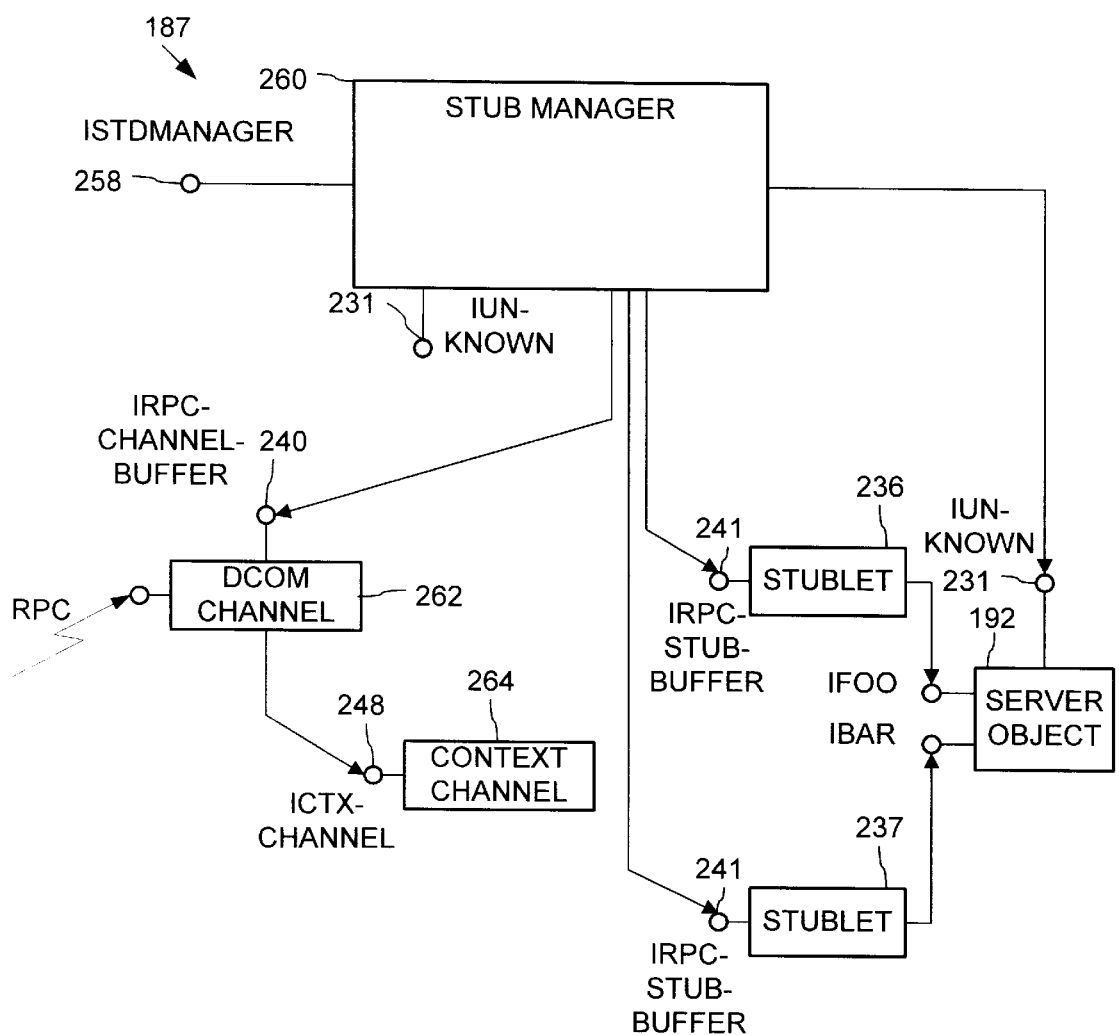
FIG. 15 is a block diagram of data structures implementing a server side of the cross-apartment or -process, cross-context reference of FIG. 7.

In the illustrated object execution environment 100, the cross-context references 182–183 (FIGS. 6 and 7) are created by the COM+ runtime services 220 (FIG. 12) upon marshaling and unmarshaling an interface pointer to the server object 192 into a client context (e.g., upon passing the interface pointer over to the client as an [in] or [out] parameter of a method call). These cross-context references 182–183 are implemented, in part, using the Standard Marshaling Architecture of the Microsoft COM Remote Procedure Call (RPC). (For a more detailed discussion of the Microsoft COM RPC, see Brockschmidt, *Inside OLE, Second Edition* 277–338 (Microsoft Press 1995)). (For expository convenience, the following discussion assumes the object is standard marshaled. However, the process described also applies to server objects that are custom marshaled.) This Standard Marshaling Architecture is modified in the illustrated environment to also create the cross-context reference data structures according to the invention as described below. The following discussion explains in greater detail the various steps involved in marshaling and unmarshaling for each combination of destination context (e.g., same apartment, cross apartment, and cross process) and interface pointer type (e.g., wrapper, proxy and naked). FIGS. 13–15 show the relative placement of context-specific data structures with respect to the COM RPC Standard Marshaling Architecture.

For purposes of the following cross-context reference creation discussion, an interface pointer is termed a "proxy" when it is representing an interface on a server object that resides in a different apartment. In the illustrated execution environment 100, an interface pointer that is a proxy supports an "IStdManager" interface 258. An interface pointer is termed a "wrapper" when it represents an interface on a server object that resides in a different context but within the same apartment. An interface pointer that is a wrapper supports an "wrapper" interface 244. An interface pointer that is neither a proxy nor a wrapper is termed "naked".

Same Apartment, Cross-Context Case

Figure 12:
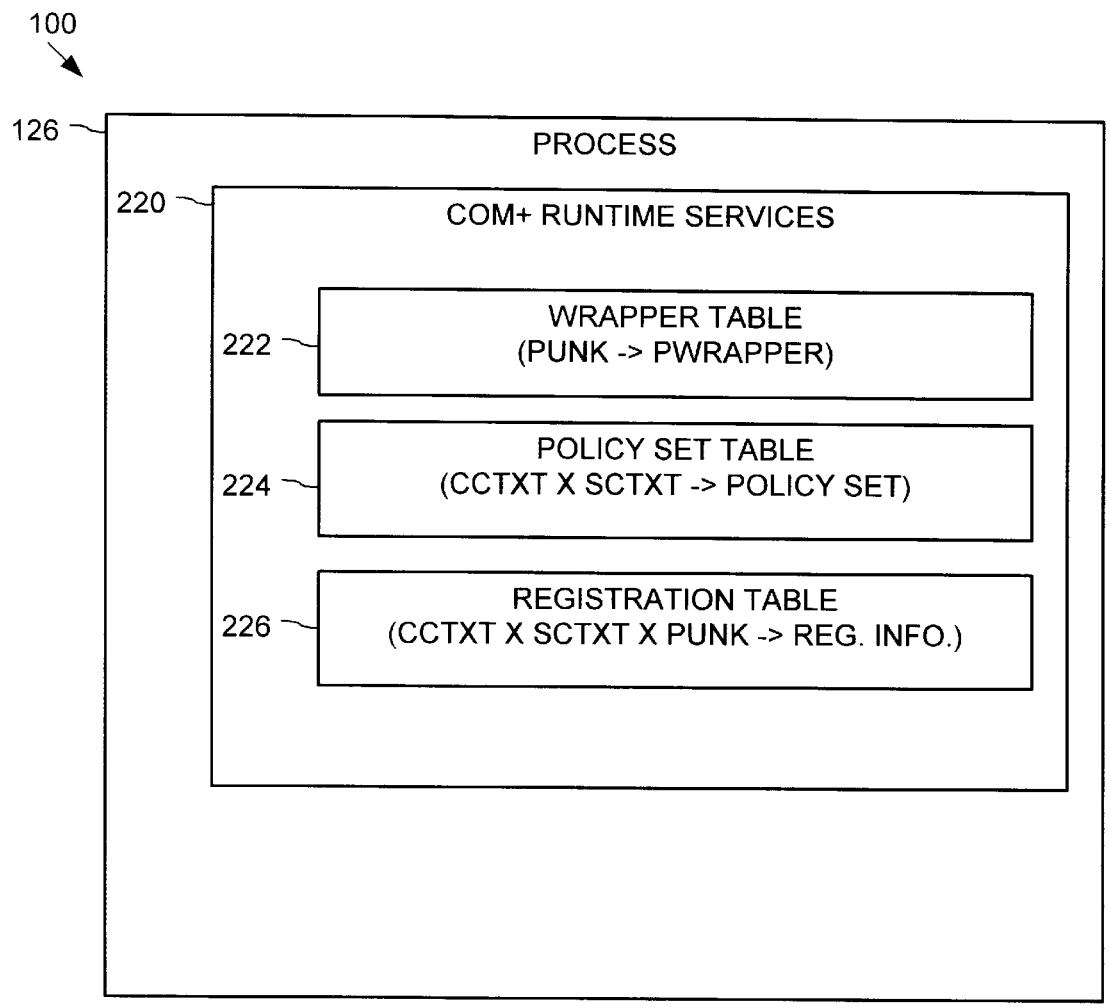
FIG. 12 is a block diagram of cross-context reference tracking data structures in the object execution environment of FIG. 3.
Figure 13:
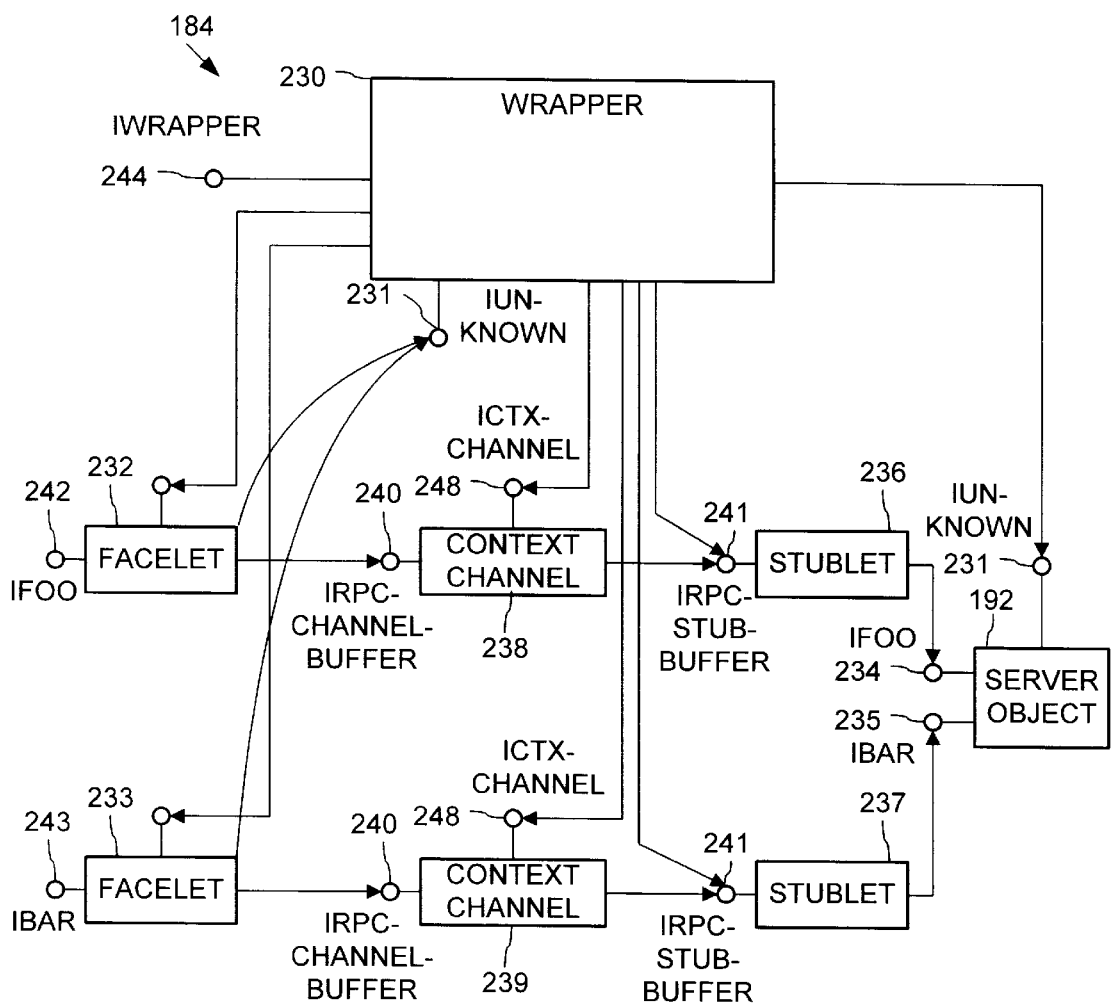
FIG. 13 is a block diagram of data structures implementing the same-apartment, cross-context reference of FIG. 6.

With reference to FIG. 13, the wrapper 184 of the same apartment, cross-context reference 182 (FIG. 6) is created by the COM+ runtime services 220 (FIG. 12) when a native interface pointer to the server object 192 is marshaled from the server object's context 199. The wrapper 184 includes a wrapper object 230, a set of interface proxies 232–233 (called "facelets") and interface stubs 236–237 that correspond to individual interfaces 234–235 on the server object 192, and context channels 238–239. The wrapper object 230 acts as a proxy manager in the COM RPC Standard Marshaling Architecture to manage the facelets 232–233 and stublets 236–237. In accordance with the Standard Marshaling Architecture, the facelets and stublets are generated by a MIDL compiler from interface definition language descriptions of the server object's interfaces. The facelets 232–233 are generated to provide interfaces 242–243 that match respective interfaces of the server object 192 (e.g., with an identical virtual function table structure 64 of FIG. 2), however the facelets' underlying implementation of the interfaces' methods operate to pass the client's method calls through the context channel to the stublets. The stublets 236–237 then issue the method calls to the actual interfaces 234–235 on the server object 192. In the same apartment case, the facelets and stublets are termed "light-weight," meaning they do not perform marshaling and unmarshaling of call parameters and associated data into an RPC. The context channels 238–239 implement context switching between the client's context 198 and that 199 of the server object 192 by dispatching policy events to the appropriate policy set for the client and server context pair. The context channels 238–239 and the stublets 236–237 support an "IRpcChannelBuffer" interface 240 and an "IRpcStubBuffer" interface 241 (which are standard interfaces defined per the COM RPC Standard Marshaling Architecture), respectively, which are used to pass the client's method invocations through to the server object 192.

On marshaling the native interface pointer to the server object 192 from the server object's context 199, the COM+ runtime services utilize the server object's "IUnknown" interface pointer to look up an existing wrapper object 230 for the server object 192 from the wrapper table 222 (FIG. 12). The COM+ runtime services uses the same wrapper for all contexts in the same apartment as the server object, and thus uses the wrapper object 230 identified in the wrapper table 222 if any exists. Otherwise, when an existing wrapper is not found, the COM+ runtime services create a new wrapper object 230 for the server object and adds a wrapper table entry that maps the server object's IUnknown interface pointer to the new wrapper object 230 into the wrapper table 222. (Some alternative implementations of the invention may provide a different wrapper to the server object for each client context. In which case, the runtime services look up the wrapper to the server object for the particular client context. If not found, the wrapper is created and an entry added to the client context's wrapper table.) After the wrapper object 230 is identified or created anew, the COM+ runtime services 220 checks whether the facelet, context channel and stublet data structures corresponding to the interface pointer being marshaled have already been created. If not, the COM+ runtime services 220 creates these data structures. The COM+ runtime services 220 then completes the marshaling of the native interface pointer from the server object's context 199 by substituting a direct pointer to the corresponding facelet's interface 242–243.

When the interface pointer is then unmarshaled in the client context 198, the COM+ runtime services issue a query interface call using the unmarshaled interface pointer to request an "IWrapper" interface. Since the facelet 232–233 is aggregated into the wrapper object 230, this call returns an interface pointer to the "IWrapper" interface 244 on the wrapper object 230. The "IWrapper" interface is defined as shown in the program listing 245 in FIG. 16, and includes a "LookupChannel" method that provides a lookup of the context channel 238–239 of the facelet 232–233. Using the "LookupChannel" method on the "IWrapper" interface, COM+ obtains a pointer to an "ICtxChannel" interface 248 on the context channel 238–239 behind the facelet 232–233. The "ICtxChannel" interface is defined as shown in the program listing 249 in FIG. 17.

With the "ICtxChannel" interface pointer, the COM+ runtime services then call a "Register( )" method on the context channel 238–239 to inform the context channel that the interface represented by the facelet to which it is connected is being unmarshaled in the client context 198. In the "Register( )" method, the context channel 238–239 obtains the client context 198 using a "CoGetCurrentContext" API. The context channel then looks up the policy set of the client and server context pair from the policy set table 224 (FIG. 12), to which the context channel delivers policy events during method invocations on the reference 184. If no policy set associated with the client and server context pair exists, the context channel creates the policy set using the contexts' policy makers as described above and adds the policy set into the policy set table. The context channel also adds information into the registration table indicating that the facelet interface 242, 243 has been unmarshaled into the client context 198.

Because the facelets 232–233 for all same apartment, cross-context references to the server object 192 are aggregated into the wrapper object 230, any "AddRef( )" and "Release( )" method invocations on the facelet interfaces 242–243 are passed to the wrapper object 230. The wrapper object's implementations of these methods update the registration information in the registration table 226 to reflect the number of references to the server object held by clients in the client context 198.

On marshaling of the wrapper object or facelets into another client context in the apartment (e.g., when the client passes its reference to the facelet interfaces 242–243 as a parameter in a call), the same-apartment, cross-context reference to the server object is set up similarly to the marshaling of a direct interface pointer to the server object 192 just described. In the case of the wrapper object or facelets reference, however, no marshaling is involved.

Cross-Apartment Case

With reference to FIGS. 14 and 15, the proxy 186 and stub 187 of the cross-apartment, cross-context reference 183 (FIG. 7) is created by the COM+ runtime services 220 (FIG. 12) when a native interface pointer to the server object 192 is marshaled from the server object's context 199 and unmarshaled into a client context 198 in another apartment (whether in the same process, another process or another machine). The proxy 186 and stub 187 use standard marshaling per the COM RPC Standard Marshaling Architecture to remote method invocations between the apartments, with the addition of data structures to provide context switching during the method invocations.

More specifically, the data structures of the proxy 186 (FIG. 14) for the server object reference 183 includes a proxy manager 250 to manage the facelets 232–233 for the server object 192 as well as DCOM channels 252–253 as per the conventional COM RPC Standard Marshaling Architecture. The stub 187 (FIG. 15) includes a stub manager 260, a DCOM channel 262, and the stublets 236–237 of the server object's interfaces 234–235 also per the conventional COM RPC Standard Marshaling Architecture. The illustrated proxy 186 and stub 187 add a context channels 254–255 and 264 to the conventional Standard Marshaling Architecture before the DCOM channels 252–253 on the client-side and behind the DCOM channel 262 on the server-side. Like the context channels 238–239 (FIG. 13) for the same-apartment case, the context channels 254–255 and 264 deliver policy events during the client's method invocations to the server object. Only, the context channels 254–255 in the proxy 186 deliver client-side policy events to the client-side policy set 195 (FIG. 7), while the context channel 264 in the stub 187 deliver server-side events to the server-side policy set 196 (FIG. 7). The proxy's context channels 254–255 also provide processing of cross-context marshaling of the proxy 186 within the client's apartment. In other words, the same remote proxy 186 is used for all contexts in the client apartment.

The conventional data structures of the proxy 186 and stub 187 are created using the usual COM RPC Standard Marshaling Architecture process. The COM+ runtimes services add extra steps to this process to create the context channels 254–255 and 264, and the client- and server-side policy sets 195–196, as well as registering in the COM+ runtime services' tables (FIG. 12). Specifically, upon marshaling a naked interface pointer from the server context 199 to another apartment, the COM+ runtime services create the context channel 264 (FIG. 15) and the server-side policy set 196 (FIG. 7). The COM+ runtime services also register the server-side policy set 196 in the policy set table 224. Further, a pointer to the server context object (which is required to be apartment agile, meaning the object can be called directly from any context or apartment in the process) is marshaled with the server object interface pointer to the client apartment for use in generating the client-side policy set. Context property objects of the server context that are envoys (described above) also are marshaled to the client context 198 for adding to the client-side policy set 194 (FIG. 7).

On unmarshaling the interface pointer in the client apartment, the COM+ runtime services create the context channels 254–255 (FIG. 14) and the client-side policy set 195 (FIG. 7), including adding envoys marshaled from the server context 199. The COM+ runtime services also register the server-side policy set 195 in the policy set table 224 (FIG. 12).

Wrapper and proxy type interface pointers on the server object 192 are marshaled and unmarshaled cross-apartments similarly to the cross-apartment marshaling of a naked interface pointer just described. For a wrapper interface pointer, the wrapper object 230 obtains a naked interface pointer on the server object 192, and delegates to marshaling the naked interface pointer via the Standard Marshaling Architecture as just described. For a proxy interface pointer, the proxy interface pointer is marshaled in such a way as to produce a same marshaled representation (called an "OBJREF") of the interface pointer as would be generated when marshaling a naked interface pointer to the server object. The proxy interface pointer can then be unmarshaled in the same manner as the naked interface pointer.

Cross-Process and Cross-Machine Cases

The cross-process and cross-machine marshaling and unmarshaling of server object interface pointers is similar to that of the cross-apartment case except that the "OBJREF" marshaled representation of the interface pointer is generated to also contain the marshaled server context for use in forming the client-side policy set.

The following Table 1 summarizes the processing to marshal and unmarshal the various interface pointer types for each of the above described destination context types.

TABLE 1

Marshaling And Unmarshaling Of Server Object Interface Pointers.

|  | NAKED | WRAPPER | PROXY |
|---|---|---|---|
| Cross-Context | Marshaling: Create/find Wrapper Unmarshaling: Obtain Context channel Create/find policy set Add registration info | Marshaling: None Unmarshaling: Obtain Context channel Create/find policy set Add registration info | Marshaling: None Unmarshaling: Obtain Context channel Create/find policy set Add registration info |
| Cross-Apartment | Marshaling: Create/find stub manager Create/find remote policy set Unmarshaling: Create/find proxy manager Create/find policy set Add registration info | Obtain naked pointer Follow steps for naked pointer | Marshaling: Marshal proxy manager Unmarshaling: Create/find proxy manager Create/find policy set Add registration info |
| Cross-Process/ | Marshaling: Create/find stub |  | Marshaling: Marshal proxy |

TABLE 1-continued

Marshaling And Unmarshaling Of Server Object Interface Pointers.

| | NAKED | WRAPPER | PROXY |
|---|---|---|---|
| Cross-Machine | manager<br>Create/find remote policy set<br>Assign ContextId to server context<br>Marshal server context<br>Unmarshaling<br>Create/find proxy manager<br>Unmarshal server context<br>Create/find policy set<br>Add registration info | Obtain naked pointer<br>Follow steps for naked pointer | manager<br>Marshal server context<br>Unmarshaling<br>Create/find proxy manager<br>Unmarshal server context<br>Create/find policy set<br>Add registration info |

Method Invocations

The following discussion briefly explains the sequence of events that occur during method invocation by the client using the server object references 182–183 (FIGS. 6 and 7). These calls can be broadly classified into two groups, cross-context calls (via the wrapper 184 in FIG. 13) and remote calls (via the proxy 186 and stub 187 in FIGS. 14 and 15).

Same Apartment, Cross-Context Calls

When the client 190 makes a method invocation on the facelet 232–233 in the wrapper 184 (FIG. 13), the facelet generates a marshal packet and delivers the packet to the context channel 238–239 to which the facelet connects for onward transmission to the stublet 236–237. The context channel 238–239 obtains the client context 198 using the "CoGetCurrentContext( )" API and performing a lookup in the policy set table 224 (FIG. 12) to see if the interface reference has been legally passed to the client context. If this check fails, the context channel fails the call and returns a "CO_E_WRONG_CONTEXT" result. Otherwise, the context channel delivers call events in order to client-side policy objects in the client-side policy set 188 (FIG. 6), switches to server context 199, delivers call events to server-side policy objects in the server-side policy set 189, and invokes the method on the server object 192 through the stublet 236–237. When the method invocation on the server object 192 returns, the stublet generates a marshal packet and returns the packet to the context channel 238–239 for transmission back to the facelet 232–233. The context channel 238–239 delivers return events to server-side policy objects 189, switches back to the client context 198, delivers return events to client-side policy objects 188, and returns to the facelet. The facelet returns to the client after unmarshaling the packet.

In some alternative implementations of the invention, context event delivery can be configured so that context events are delivered to certain policy objects at different stages of the call. In one such implementation for example, context events can be delivered at each side of the call to particular policy objects in the stages: before marshaling, after marshaling, before synchronization, and after synchronization.

On an error during context event delivery, the context channel preferably causes all policy objects that have processed context events for the call to undo or reverse their context event processing. The context channel calls the policy objects that were delivered a context event during the call in reverse of the order in which the context events were delivered. A policy object can issue an error during the context policy delivery to initiate this error handling by calling a "nullify( )" member function of the "IRpcCall" interface, a pointer to which is passed to the policy object with the context event as shown in FIG. 8.

Remote Calls

The remote calls via the proxy 186 and stub 187 (FIGS. 14 and 15) are very similar to the cross-context calls except that the proxy's context channel 254–255 (FIG. 14) delivers call events to the client-side policy objects 188, leaves the client context 198, and delegates the marshaled packet to the proxy's DCOM channel 252–253 for onward transmission to the server object's process. The DCOM channel 252–253 switches from the client apartment if necessary and delegates to the RPC service of the COM RPC Standard Marshaling Architecture. When the marshaled packet arrives at the server's process, the packet is delivered to the stub's DCOM channel 262, which switches to the server object's apartment. The stub's DCOM channel 262 then delivers the marshal packet to the context channel 264 through the "ICtxChannel::Invoke( )" method. The context channel 264 switches to the server object's context 199, delivers call events to the server-side policy objects 189 (FIG. 7) and invokes the method on the server object 192 through the stublet 236–237. The sequence of events is reversed on return from the method.

Activators

Figure 18:
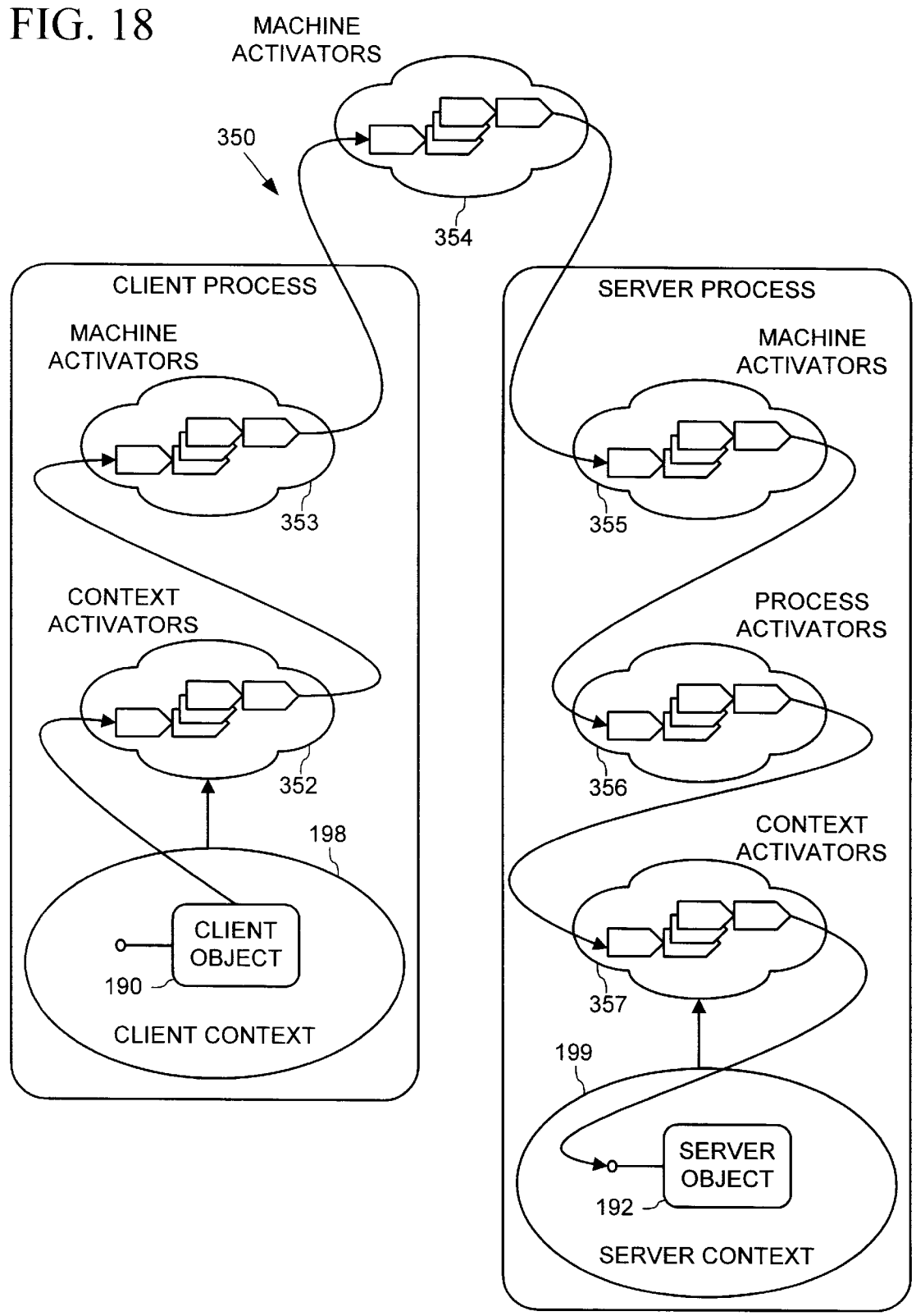
FIG. 18 is a block diagram of a chain of activators that establish a context of a component application object in the object execution environment of FIG. 3.

With reference to FIG. 18, the object context object 160 (FIG. 4) of a context in the illustrated execution environment 100 (FIG. 3) is created at instantiation of a first object in the context by activators 352–357. In COM+, the activators 352–357 provide extensible object instantiation services via delegation of an object instantiation request through a potentially distributed chain 350 of activators (termed an "activator chain" 350). The activator chain 350 is responsible for activating a component application object (e.g., a server object 192) of the requested class in the proper location and context (e.g., server context 199). Individual activators in the chain 350 determine a context for a new object, select or create a location and context for the new object, as well as create and return an interface pointer to the new object in that context. In COM+, the activators 352–357 are implemented as COM objects that support an "ISystemActivator" interface (defined in the program listing 370 shown in FIG. 20, and described below).

Activation begins at an object instantiation service (e.g., the "CoCreateInstance( )" API) that receives an object instantiation request for a component application object of a specified class from a client (e.g., a client component application object 190 or other client program). The object instantiation service processes standard COM activation logic, and can also delegate further activation processing over to another activator. The other activator can modify context properties of the context in which the component application object is to be instantiated, and further delegate to yet other activators (and so on, through plural activators forming the activator chain 350). The activators to which the instantiation request is delegated can include custom activators in addition to COM+-provided activators. The activators may be specific to the requested component application object class, the client context (e.g., client context activators 352 and server context activators 357), the location (e.g., process activators 353, 356 and machine activators 354, 355), and other context properties.

The delegation through the activator chain 350 decides the properties for the context in which the component application object of the requested class is to be activated, such as the machine, process, apartment, and other domains. In some cases, traversal of the activator chain 350 results in the server component application object 192 being created in the same context as the client object 190 that requested its creation (i.e., the client context 198). In other cases, the traversal results in the component application object 192 being created in another context (i.e., a separate server context 199). If the resulting context does not yet exist, the activator chain 350 creates the server context 199 (i.e., the object context object 160 with appropriate context property objects 164). In still other cases, the activator chain can terminate activation of the object, or defer activation. For example, the activator chain can provide the above-mentioned JIT activation behavior by creating a wrapper or stub of the object without actually instantiating the object itself, and defer completing activation until the wrapper or stub instantiates the object on receiving a call to the object.

In COM+, the activator chain begins with an initial delegation to an activator (termed the "immediate activator") by the "CoCreateInstance( )" or other object creation API. This initial delegation by the "CoCreateInstance( )" API is to a class-specific activator (i.e., specific to the server object's class) if any is designated for the class. The class-specific activator can implement specific processing for the class during instantiation, such as setting particular context properties when objects of the class are instantiated. Otherwise, if no class-specific activator is designated for the class, the "CoCreateInstance( )" API delegates to a default activator of the client context 198. The default client context activator can implement activation processing specific to a particular type of context. For example, contexts that incorporate particular domain-specific behaviors (e.g., a context with the above-mentioned MTS system behaviors, or a context with particular threading model behaviors) can provide a default activator to set context properties specific to the behaviors (such as, to provide a "transaction" context property in MTS contexts). Finally, if the client context 198 does not provide a default activator, the "CoCreateInstance( )" API initially delegates to a default context activator.

Activation Stages

After the initial delegation to the immediate activator, activation delegation proceeds through a multiple stage sequence. The COM infrastructure provides access to Custom Activators at the following activation stages: Services Control Manager (SCM), process, apartment, and context. The stages are further qualified to Client, Router, Server. For example, Client SCM, Router SCM, Server SCM defines explicit SCM stages an activation may go through. The stages model the COM hierarchy for locating where an object is created. At each stage, custom activators that are specific to the server object class, in addition to COM+-provided activators, may be invoked. The custom activators influence the location (i.e., machine, process, apartment, and context) where the server object is created, as well as initializing properties of the server object's context. In alternative implementations of the invention, the client also can contribute custom activators to which activation is delegated in particular of the stages.

The process of activation goes through the various stages in a particular order, called a "chain" or "journey." An earlier stage delegates to the current stage that may delegate on to the next stage, as shown in the following Table 1. What activator is invoked when the current activator delegates onward is controlled by the COM+ infrastructure. The notation used in the following Table 1 is: <stage>A(<side>) where the <stage> is represented as C for Context, A for Apartment, P for Process, S for SCM, and where the <side> is represented as C for Client, R for Router, S for Server. There is no backtracking allowed between stages in a journey, e.g., the server-side apartment activators stage ("AA(S)") can't modify the prototype context and then have server-side process activators stage ("PA(S)") act on it. As shown in the Table 2, all journeys will invoke the custom activators in the server-side process activators stage ("PA (S)"), the server-side apartment activators stage ("AA(S)"), and the server-side context activators stage ("CA(S)").

TABLE 2

The Activation Journey

| Journey | Stages Traversed |
| --- | --- |
| Same Context; Same Apartment; Same Process | CA(C)->PA(S)->AA(S)->CA(S) |
| Same Machine Different Process Different Machine | CA(C)->SA(C)->SA(S)->PA(S)-> AA(S)->CA(S) |
| Normal | CA(C)->SA(C)->SA(S)->PA(S)-> AA(S)->CA(S) |
| Load Balanced | CA(C)->SA(C)->SA(R)->SA(S)-> PA(S)->AA(S)->CA(S) |

Activation Properties Flow

Figure 19:
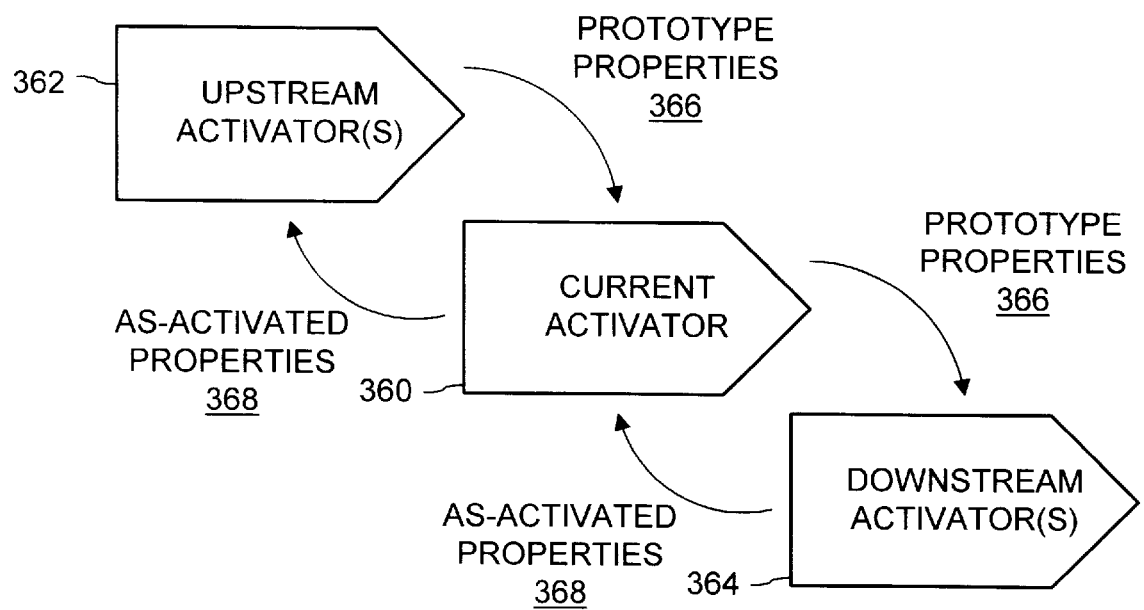
FIG. 19 is a flow diagram of activation data in the chain of activators of FIG. 18.

With reference to FIG. 19, activation properties information flows between the activators 352–357 in the chain 350 (FIG. 18) in both forward and reverse directions. A current activator 360 (FIG. 19) receives a set of activation properties (called "prototype properties" 366) that flow to the current activator from upstream activators 362. Other activation properties (called the "as-activated properties" 368) flow from downstream activators 364 to the current activator 360. Each activator 360, 362, 364 can modify the activation properties to control aspects of the context an object is activated in. The current activator 360 can delegate to a downstream activator 364 or can complete the activation itself. The (downstream-most) activator that completes the activation must supply a set of activation properties that describe the 'as-activated' object. The as-activated properties flow on the return from each activator to its immediate upstream activator (i.e., as an [out] parameter of the activation calls). In the illustrated activation properties flow, the "as-activated" properties can be modified by the activators as the properties are flowed in the reverse direction. It is undefined whether the prototype properties passed on as delegating to a downstream activator can be used when the delegation returns with the as-activated properties. In an alternative implementation of the invention, the reverse flow can be accomplished by invoking the activation chain in a second pass that allows the activators to act on the "as-activated" properties resulting from a first pass.

With reference again to FIG. 18, the activation chain starts with an immediate activator described more fully below. The immediate activator executes in the client context 198 and is responsible for initializing all activation properties from information supplied by the client in the activation request, such as mapping between program, class and configuration identifiers (i.e., PROGID->Ref CLSID->Config ID). The immediate activator also is responsible for initializing data structures representing the prototype context and client context (hereafter termed the "prototype context representative" and the "client context representative") in the prototype properties from the policy makers in the client context 198. In particular, the immediate activator adds each policy maker in the client context that is marked with the propagate attribute (CP_PROPAGATE) into the prototype context representative. The immediate activator also adds each policy maker of the client context that is marked with the exposed attribute (CP_EXPOSE) to the client context representative. The immediate activator further initializes an "IsClientContextOK" flag to TRUE. The client context activation state (designated "CA(C)" in Table 1 above) is now run with these activation properties.

If the server object to be activated can not be in the client's process (for example, there is a remote server name) then the "IsClientContextOK" flag is set FALSE and the client-side SCM activators stage (designated "SA(C)" in Table 1 above) is delegated. The activation properties including the prototype context, and client context representative are marshaled to the SCM. The custom activators of the client-side, router-side and server-side SCM activators stages (designated "SA(C)," "SA(R)," "SA(S)" in Table 1 above) are invoked and can modify the activation properties. Eventually, the server-side SCM activators stage ("SA(S)") will delegate to the server-side process activators stage ("PA(S)") stage and the activation properties are marshaled to that process. The custom activators 356 in the server-side process activators stage ("PA(S)") can control activation properties affecting which apartment and context is used in its process. Eventually, the server-side process activators stage ("PA(S)") will delegate to the server-side apartment stage ("AA(S)") in the appropriate apartment. The custom activators in the server-side apartment activators stage ("AA(S)") can control activation properties affecting which context in this apartment is used. Eventually, the server-side apartment activators stage ("AA(S)") will delegate to the server-side context activators stage ("CA(S)"). The custom activators 357 in the server-side context activators stage ("CA(S)") control what object instance is activated. If all CA(S) Custom Activators delegate then the usual COM DllCache processing is done to complete the activation. Whichever Activator that is completing the activation is responsible for initializing and returning the "As-Activated Properties".

The "IsClientContextOK" flag can be set FALSE by any custom activator in the chain 350. It will also be set FALSE by COM+ when it determines that the Process, Apartment, or Context will change from the creator's context. Logically the server-side apartment activators stage ("AA(S)") will create a new context based upon its state.

On the other hand, if the server object 192 can be activated in the same process as the client then the server-side process activators stage ("PA(S)") is delegated to and activation processing performed similar to the server-side SCM activators stage to server-side process activators stage ("SA(S)->PA(S)") delegation previously described.

Activation Framework

A number of assumptions apply in the above-described activation journey in the illustrated extensible object execution environment 100 (FIG. 3). One, every server object in the illustrated environment 100 has a context, which may be a default context. Every context has an activator registered in it. Every process has a standard COM+ process activator. Every class may, optionally, have registered custom activators. Finally, there are process-wide class factory and class data tables. There is no assumption made about the activator registered on a context being specialized for that context. In the majority of contexts, the registered activator will be the standard COM+ process activator. The COM+ process activator is agile between all apartments and contexts in its process. An agile object is one which may legally be called directly from within any context or apartment in their process.

At each of the stages in the activation journey, the COM+-provided activator of the stage finds a list of any custom activators registered for the server object in the stage from the server object's class data (e.g., in the system registry or COM properties catalog). (In some alternative implementations, the client also can register custom activators to which activation is delegated in particular of the stages.) If the server object's class has a custom activator for the stage, the COM+-provided activator instantiates and initializes the custom activator, acquires the "ISystemActivator" interface from the custom activator, and delegates to the appropriate method on that interface. After the custom activator's activation processing, the custom activator will usually delegate to the COM+-provided standard activator which then invokes the next custom activator (if any) at this stage. When all custom activators have been processed, the COM+-provided activator will do its processing for the stage and either complete the activation or delegate on to the next stage for this journey. For example, when a transition from client or router-side to server-side occurs at a stage, the client or router-side custom activators are run first. The COM+-provided activator does its client or router-side processing. Then, the server-side custom activators are run, and the COM+-provided activator does its server-side activation processing.

Immediate Activators

An activation API call (e.g., the client's call to the CoCreateInstance, CoGetInstanceFromX, or CoGetClassObject API) starts activation with a COM+-provided immediate activator of the "nearest" activator stage. This immediate activator is the context activator if the call originates in a COM object, and the standard COM+ activator otherwise. The "immediate" activator goes through a sequence of steps, including identifying the class of the server object and acquiring data for the class.

Context Activators

In the client-side context activator stage, the immediate activator is run as a preliminary to executing custom activators. The immediate activator (the COM+-supplied context activator which is initially delegated activation from the object instantiation service) finds any custom activators designated for the particular server object class in the context stage and delegates activation to such custom activators. When all the custom activators have been delegated, the COM+-supplied context activator completes the activation processing in the stage as shown in Table 3.

TABLE 3

Stage-End Context Activator Processing.

| Stage | Operation |
| --- | --- |
| CA(C) | If object is to be created in same process, delegate to PA(S) stage.<br>If object is to be created in different process, delegate to SA(C) stage. |
| CA(S) | Obtain Class Factory: Use class table to acquire a naked reference to a class factory in this apartment.<br>Use class factory to instantiate and possibly initialize an instance.<br>Query for and return the required interfaces on the new instance. |

Process Activator

A COM+-supplied process activator is delegated activation from either the default context activator or the SCM activator. The process activator always receives fully resolved class identification from the initial immediate activator, and may in addition receive class data and location information. The process activator delegates to any custom activators that are designated for the particular server object class in the process, then completes activation processing for the stage as shown in Table 4.

TABLE 4

Stage-End Process Activator Processing.

| Stage | Operation |
|---|---|
| PA(S) | Determine Apartment: This process is the server process. Evaluate class properties to determine appropriate apartment for activation. Create or reuse existing Apartment. Delegate to AA(S) stage for that apartment to complete activation (freezing the choice of apartments). |

Apartment Activators

A COM+-supplied apartment activator is delegated activation from the process activator as indicated in Table 3. The apartment activators are the base case for legacy COM activation (objects not in an environment extension domain). The apartment activator delegates to any custom activators that are designated for the particular server object class in the process, then completes activation processing for the stage as shown in Table 5.

TABLE 5

Stage-End Apartment Activator Processing.

| Stage | Operation |
|---|---|
| AA(S) | Context Determination: Evaluate prototype context and to locate an equivalent existing context (could be the client context) or determine that a new context is required.<br>If the object is being activated in an existing context, delegate to the CA(S) stage for that context.<br>If the object is being activated in a new context. Create the context, attach the default context activator, Freeze the new Context, and delegate to it. |

SCM Activator

The COM+-supplied SCM activator gets control over the server object's activation as a result of delegation, either by a context activator or by a remote SCM activator. The SCM activator always receives fully resolved class identification, and may in addition receive class data and location information. The SCM activator delegates to any custom activators that are designated for the particular server object class in the process, then completes activation processing for the stage as shown in Table 6.

TABLE 6

Stage-End SCM Activator Processing.

| Stage | Operation |
|---|---|
| SA(C) | Determine Machine: If location information indicates another machine, then delegate to SA(S) stage or SA(R) on the remote machine. If location says 'this machine' start stage SA(S) on this machine |
| SA(R) | Determine Machine: If location information indicates another machine, then delegate to SA(S) stage on the remote machine. If location says 'this machine' start stage SA(S) on this machine. |
| SA(S) | Determine Process: This machine is where this activation will occur. Select or create server process. Delegate to PA(S) stage in that process (this freezes the choice of processes). |

Class Factory Client Context Flow

In accordance with COM, the client object 190 also can initiate activation of the server object by calling the "IClassFactory::CreateInstance( )" method on the class factory 82 (FIG. 2) of the server object. In such case, it is necessary to also flow the client context information through the activator chain, as with activation through an object instantiation API. Otherwise, the most likely result is that an instance is created and wrapped in the same context as the context of the class factory. In the illustrated environment 100, this is accomplished by substituting a reference to a helper object for that of the class factory in response to a request to the "CoGetClassObject" API (which is used to request a class factory reference). The helper object provides an implementation of the "IClassFactory::CreateInstance( )" method that uses the "CoCreateInstance" API or an immediate activator's CreateInstance method to activate the server object with the server object's actual class factory. This ensures that the client context information flows on the client's "IClassFactory::CreateInstance" request and that the COM activation semantic, "CoGetClassObject( )->CreateInstance," is identical to a "CoCreateInstance( )" API call.

Activation Interfaces

FIGS. 20 and 21 show program listings 370, 372 of interfaces used in the activators chain just described. The "CoGetObjectContext( )" API (FIG. 20) is a service provided in the COM+ runtime services that returns an interface pointer on an object's object context object. The standard activators for the stages in the activation journey implement the "IActivator" interface (FIG. 20), which includes "CreateInstance( )" and "GetClassObject( )" methods. The "CreateInstance( )" method creates an instance of a specified server object, and returns an interface pointer on the server object. The "GetClassObject( )" method is used to obtain an interface on a class factory (e.g., the class factory 82 of FIG. 2) of a specified server object. The "ISystemActivator" interface (FIG. 20) is implemented by custom activators to which the system-provided standard activators delegate during activation processing in the various stages of the activation stage as described above. The "ISystemActivator" interface likewise includes "CreateInstance( )" and "GetClassObject( )" methods. The methods in the "ISystemActivator" interface include parameters that pass the above-described prototype properties downstream, and as-activated properties upstream through the activation chain. The activation properties are initialized and manipulated using the "IInitActivationPropertiesIn," "IActivationPropertiesIn," and "IActivationPropertiesOut" interfaces shown in FIG. 21.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A system for providing an object execution environment in which objects have contexts that are an intersection of environment domains, the object execution environment being extensible to incorporate new behaviors specific to extended environment domains, the system comprising:

an activator designation setting for designating an activator, the setting being settable to designate an environment extending activator operative to determine that a context of an object being activated include an extended environment domain; and an object instantiation service operative at activation time of an object having a specified class to delegate processing determinative of a context in which the object is to be activated on to an activator chain that comprises the designated environment extending activator.

2. The system of claim 1 wherein the activator designation setting designates the environment extending activator of the specified class of the object.

3. The system of claim 1 wherein the activator is designated for the client context.

4. A system for executing component application objects within an environment having a plurality of domains that pertain to objects executing in the environment, a set of the domains that pertain to an object forming a context of the object, the system comprising:

a plurality of object activators operative in response to being delegated activation of a specified object within a specified context to determine to modify any domains of the context for the specified object, and to further delegate activation of the specified object in the modified context to another of the object activators; and an object instantiation service having an interface for calling by a client object to request instantiation of a class of server object, and operative in response to the instantiation request to delegate activation of the server object within a context of the client object to a selected one of the object activators, whereby activation of the server object is delegated through a sequence of the activators and such delegation through the sequence results in a destination context in which the server object is instantiated;

wherein the system is modifiable to include new activators for instantiation of objects to have contexts that incorporate new domains to thereby extend the environment.

5. A process for extending an object execution environment to provide an added domain and a behavior specific to the added domain, objects in the object execution environment having a context being an intersection of domains, the process comprising:

defining an environment-extending activator with functionality responsive to being delegated activation of an object to modify a context in which the object is to be activated to include the added domain; and at activation of the object, delegating activation of the object from an object instantiation service through a chain of activators that comprises the environment-extending activator, whereby the object is activated in a context that includes the added domain.

6. A method of providing an object execution environment with composable environment extensions that bound objects within domains subject to domain-specific environment behaviors, the method comprising:

for a domain in the environment, defining a create-time event sink, a reference-time event sink and a call-time event sink to provide processing of environment behaviors specific to the domain at create-time, reference-time and call-time, respectively;

on creation of an object in the environment, causing the create-time event sink to process the create-time environment behaviors specific to the domain for the object;

on passing a reference to the object in the environment, causing the reference-time event sink to process the reference-time environment behaviors specific to the domain for the object; and on calls to the object in the environment, causing the call-time event sink to process the call-time environment behaviors specific to the domain for the object.

7. A method of providing an object execution environment with composable environment extensions, the method comprising:

defining a plurality of activators for performing activation-time processing of the composable environment extensions;

defining a plurality of policy makers for performing reference passing-time processing of the composable environment extensions;

defining a plurality of policy objects for performing call-time processing of the composable environment extensions;

at object creation, causing the activators to construct a context object to represent a first context of the instantiated object comprising an intersection of the composable environment extensions, the context object having a collection of the policy makers for the intersecting composable environment extensions;

at creation of a reference to the instantiated object from a second context differing in at least one composable environment extension from the first context, causing the policy makers of the first and second contexts to contribute policy objects for the differing composable environment extensions to the reference; and at issuance of a call to the instantiated object using the reference, causing the contributed policy objects to process side effects of switching between the differing composable environment extensions.

8. A computer-readable storage medium having computer-executable instructions stored thereon for an extensible object execution environment having intersecting domains bounding groups of objects executing within the environment, the instructions comprising:

object creation code responsive to a request of a client for creation of a component application object in the extensible object execution environment to invoke activators for processing object creation effects of the domains and establish a context representing an intersection of the domains within which the component application object is created, the context having context properties specifying the intersection of the domains and policy makers of such domains;

reference marshaling code operative on marshaling a reference to the component application object from a separate context having at least one domain not in common with the component application object's context to invoke the policy makers of the contexts for processing reference passing effects of the domains and establish a set of policies for invoking by the reference on calls made from the separate context using the reference, the policies processing cross-boundary effects of the at least one domain not in common between the contexts.

9. A component application object execution system having an object model for an extensible object execution environment having intersecting domains bounding groups of component application objects executing within the environment, the object model comprising:

a cross-context reference proxy for a client in a client context to reference and issue calls to a component application object in a server context, the client and server contexts characterizing different intersections of domains in the environment, the cross-context reference proxy issuing policy events on a call from the client to the component application object;

a set of policies associated with the cross-context reference proxy and responsive to the issued policy events to process cross-domain boundary call effects for domains differing between the client and server contexts.

10. The component application object execution system of claim 9 wherein the object model further comprises:

the policies set associated with the cross-context reference proxy contains policies begin specialized to references from the client context to component application objects in the server context, and containing policies specific to the domains differing between the client and server contexts.

11. The component application object execution system of claim 9 wherein the object model further comprises:

object context objects associated with the client and component application object and representative of the client context and the server context, respectively; and a collection of context properties associated with each of the object context objects and representing domains in the respective context represented by the object context object.

12. The component application object execution system of claim 11 wherein the object model further comprises:

a collection of policy makers associated with each of the object context objects and contributing policies for the domains in the context represented by such object context object at creation of the cross-context reference proxy to the policies set.

13. The component application object execution system of claim 12 wherein the context properties are objects, at least some of which also operate as policy makers that contribute a policy for the domain represented by the context property.

14. In a runtime environment, where components execute in a context including a set of context-specific behaviors, a method comprising:

receiving a reference request from a component in a first context;

determining that the reference request is for a component of a second context;

determining a first set of context-specific behaviors to enforce on cross-context requests made by the component in the first context to the component in the second context;

returning to the component in the first context, a behavioral monitoring reference to the component in the second context;

receiving a cross-context service request from the component in the first context using the behavioral monitoring reference; and determining that the cross-context service request violates a context-specific behavior contained in the determined first set of context-specific behaviors.

15. The method of claim 14, wherein the first set of context-specific behaviors enforced on a cross-context service request made using the behavioral monitoring reference, is the union of the context-specific behaviors of the first and second contexts.

16. The method of claim 14, wherein a specific context-specific behavior is monitored by a component.

17. The method of claim 14, wherein determining that the cross-context service request violates a context-specific behavior is through data delivered between the first and second contexts through a buffer of data.

18. The method of claim 14 wherein the context associated with a component is itself a component containing a list of components, each component in the list representing a context-specific behavior for the context component.

19. The method of claim 14, further comprising:

generating a side effect upon determining that the context-specific behavior has been violated.

20. The method of claim 14, further comprising:

receiving a call-back reference request for the component in the second context to make call-back requests to the component in the first context;

determining a second set of context-specific behaviors to enforce on cross-context requests made by the component in the second context to the component in the first context;

returning to the component in the second context, a behavioral monitoring call-back reference to the component in the first context;

receiving a cross-context service request from the component in the second context using the behavioral monitoring call-back reference; and determining that the cross-context service request violates a context-specific behavior contained in the determined second set of context-specific behaviors.

21. The method of claim 20 wherein the first and second sets are not equivalent.

22. The method of claim 21 wherein context-specific behaviors are monitored by context specific-behavioral components and a determination that a cross-context service request violates a context-specific behavior is determined through data sharing between a context-specific behavioral component in the first context and a context-specific behavioral component in the second context.

23. A system for executing components within an environment which includes plural policy agents that act as sinks for events triggered when components in the environment request services, the system comprising:

a runtime service for receiving a request for a reference to a component, for returning the reference to the component, and for associating with the reference returned, a set of policy agents; and a runtime service for receiving a service request at the returned reference, for determining that the service request triggers an event handled by a policy agent in the set associated with the returned reference, and for invoking the policy agent to handle the triggered event.

24. The system of claim 23, further comprising:

a runtime service for discovering the policy agents in the domain of a component requesting a reference, for discovering the policy agents in the domain of a component for which a reference is being requested, and for selecting the set of policy agents associated with the reference returned from the policy agents discovered in the requesting and requested domains.

25. The system of claim 23, further comprising:

a runtime service for obtaining data for a policy agent invoked to handle a triggered event, where the data obtained is from a policy agent in another domain.

* * * * *

UNITED STATES PATENT AND TRADEMARK OFFICE
CERTIFICATE OF CORRECTION

PATENT NO. : 6,442,620 B1
DATED : August 27, 2002
INVENTOR(S) : Thatte et al.

It is certified that error appears in the above-identified patent and that said Letters Patent is hereby corrected as shown below:

Title page,
Item [56], References Cited, U.S. PATENT DOCUMENTS, "6,104,147 A" should read -- 6,105,147 --.
OTHER PUBLICATIONS,
"Sessions, com and Dcom" reference, "Sharing and Scalability" should read -- "Sharing and Scalability" --.
"Tripathi et al.," reference, "Design of a Remote Procedure Call System for Object-Oriented Distributed Programming" should read -- "Design of a Remote Procedure Call System for Object-Oriented Distributed Programming" --.

Column 6,
Line 41, "wrapper" should read -- IWrapper --.

Column 15,
Line 23, "pctxtdest" should read -- pctxtDest --.

Column 17,
Line 34, "wrapper" should read -- IWrapper --.

Signed and Sealed this

Seventh Day of October, 2003

JAMES E. ROGAN
*Director of the United States Patent and Trademark Office*